(12) United States Patent
Boudville et al.

(10) Patent No.: US 10,857,456 B2
(45) Date of Patent: Dec. 8, 2020

(54) LINKET, ESPORTS AND A THEME PARK

(71) Applicants: Wesley John Boudville, Perth (AU); Tina Marie Angermeier, Pasadena, CA (US)

(72) Inventors: Wesley John Boudville, Perth (AU); Tina Marie Angermeier, Pasadena, CA (US)

( * ) Notice: Subject to any disclaimer, the term of this patent is extended or adjusted under 35 U.S.C. 154(b) by 0 days.

(21) Appl. No.: 16/350,658

(22) Filed: Dec. 18, 2018

(65) Prior Publication Data
US 2020/0188780 A1    Jun. 18, 2020

(51) Int. Cl.
| | |
|---|---|
| A63F 13/31 | (2014.01) |
| G06Q 30/02 | (2012.01) |
| G05B 11/00 | (2006.01) |
| G06K 19/06 | (2006.01) |
| A63F 13/847 | (2014.01) |
| A63F 13/533 | (2014.01) |
| G06K 7/14 | (2006.01) |

(52) U.S. Cl.
CPC ............ *A63F 13/31* (2014.09); *A63F 13/533* (2014.09); *A63F 13/847* (2014.09); *G05B 11/00* (2013.01); *G06K 7/1413* (2013.01); *G06K 19/06028* (2013.01); *G06Q 30/0239* (2013.01); *A63F 2300/575* (2013.01)

(58) Field of Classification Search
None
See application file for complete search history.

(56) References Cited

U.S. PATENT DOCUMENTS

| | | | | |
|---|---|---|---|---|
| 7,500,917 | B2* | 3/2009 | Barney | A63H 30/04 463/37 |
| 7,749,089 | B1* | 7/2010 | Briggs | A63F 9/24 472/136 |
| 7,850,527 | B2* | 12/2010 | Barney | A63F 13/86 463/37 |
| 8,608,535 | B2* | 12/2013 | Weston | A63F 13/10 463/1 |
| 9,480,913 | B2* | 11/2016 | Briggs | G06K 19/06037 |
| 2002/0090985 | A1* | 7/2002 | Tochner | A63F 13/655 463/1 |
| 2006/0154726 | A1* | 7/2006 | Weston | A63F 13/327 463/37 |
| 2006/0287030 | A1* | 12/2006 | Briggs | G07F 17/3239 463/9 |
| 2006/0293103 | A1* | 12/2006 | Mendelsohn | G06Q 30/02 463/42 |
| 2008/0014835 | A1* | 1/2008 | Weston | A63F 13/10 446/484 |

(Continued)

*Primary Examiner* — Seng H Lim

(57) ABSTRACT

A theme park permits interactions between visitors and remote viewers in Mixed Reality. The park has devices controllable by visitors and viewers. A viewer uses an app to interact. A visitor can use an app on a mobile device. Viewers watch or follow a visitor (akin to esports). A viewer can change physical aspects at the park. Including opening and closing a door or window, moving a vehicle, adjusting a fountain. Visitor and viewer can form a team. A viewer can aid or hinder a visitor. Visitor and viewer can trade virtual assets. The park makes a movie for a theatre. The viewer watches the movie and captures items that the visitor uses in the park. There can be multiple Mixed Realities.

14 Claims, 18 Drawing Sheets

(56) References Cited

U.S. PATENT DOCUMENTS

| | | | |
|---|---|---|---|
| 2009/0186694 A1* | 7/2009 | Gunawardana | A63F 13/52 |
| | | | 463/31 |
| 2012/0069131 A1* | 3/2012 | Abelow | G06Q 10/067 |
| | | | 348/14.01 |
| 2012/0190455 A1* | 7/2012 | Briggs | G06K 19/06037 |
| | | | 463/42 |
| 2014/0038723 A1* | 2/2014 | Samdahl | A63F 13/822 |
| | | | 463/42 |
| 2017/0169449 A1* | 6/2017 | Heaven | G06Q 30/0203 |
| 2018/0015364 A1* | 1/2018 | Barney | A63F 13/12 |
| 2019/0108686 A1* | 4/2019 | Spivack | G06Q 20/123 |

* cited by examiner

Viewer app 81

○ Play alone

○ Play with other watchers

○ Follow visitors

○ Join a visitor's team

Figure 8

Figure 10 Reification

Figure 11  Anti-reification

Figure 12 Park Viewer in Theatre

Figure 14 Viewer + Movie + Visitor

Figure 15  Loop = Viewer + Visitor

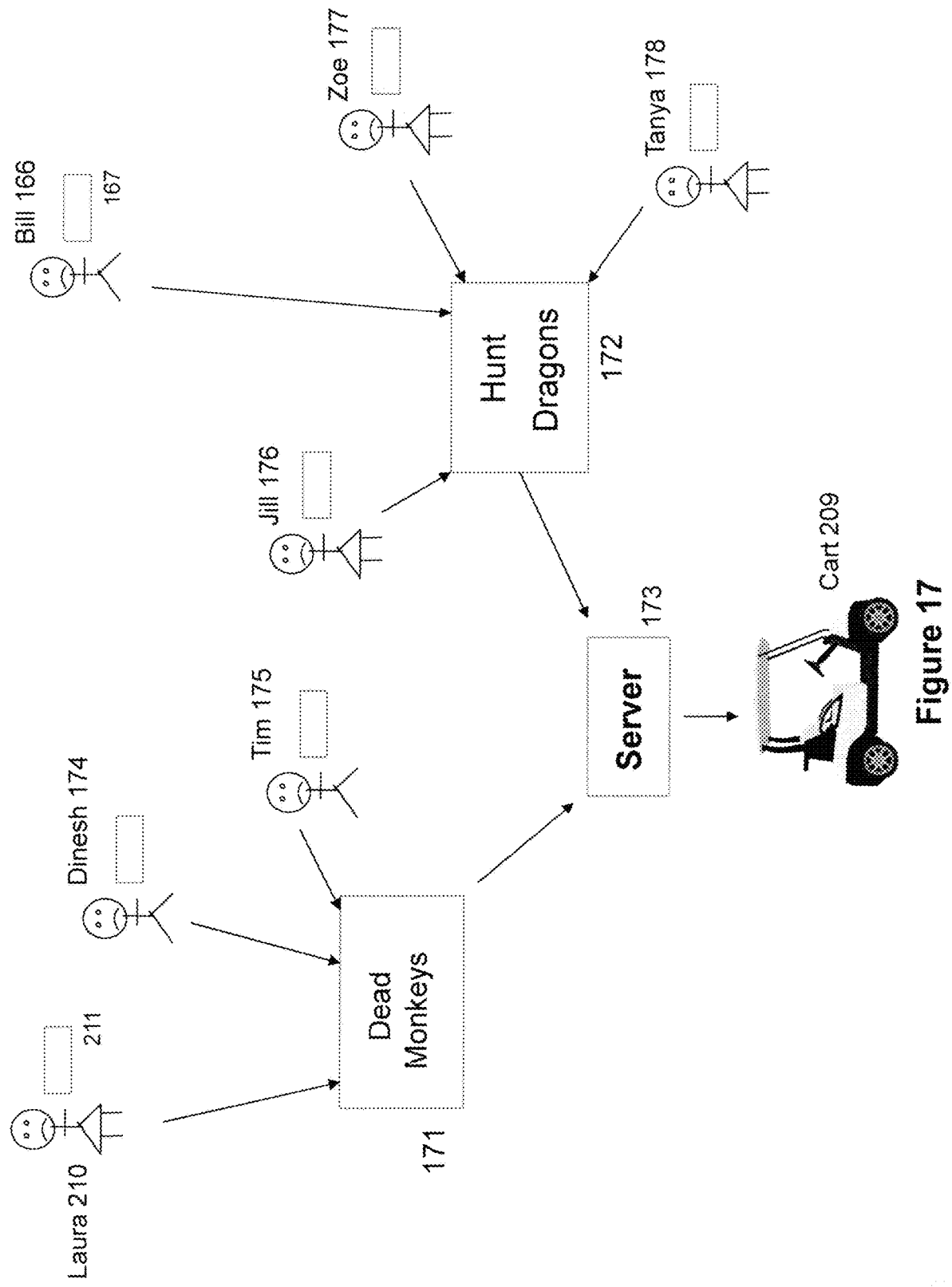

LINKET, ESPORTS AND A THEME PARK

TECHNICAL FIELD

A theme park and devices in the park.

BACKGROUND

Theme parks have exhibits or themes. These are interactive experiences for visitors. Parks struggle to make unique and more memorable experiences so visitors will keep visiting, as well as having others visit the park for the first time. The competition is other parks and other recreational pursuits, including computer games.

A problem a theme park can have is the physical size. There are legal limits on maximum attendance. While the marginal cost of an extra visitor might be small, it is expensive in terms of land and buildings for a park to significantly expand its footprint.

Another problem is that visiting a park is too expensive for many people. In terms of travel time and accomodation. Or also if the people are in less developed countries, with lower incomes compared to the incomes of most visitors.

Esports have become popular. Fans watch players play computer games. The fans might watch on their own computers (mobile phones, laptops, PCs . . . ) via an aggregated viewing platform like Twitch.™. The platform shows live or recorded video of games. The players are playing (or have played) the games. The fans are remote from the players. In general, the fans are also remote from each other. They can be at many different locations in the world.

In another esports modality, players and fans are in a stadium. The game is also broadcast so that fans not in the stadium can watch remotely.

BRIEF DESCRIPTION OF THE DRAWINGS

FIG. 8 shows a screen of viewer options.

FIG. 17 shows players in different games sending commands to a device.

DETAILED DESCRIPTION OF THE PREFERRED EMBODIMENT

What we claim as new and desire to secure by letters patent is set forth in the following claims.

Figure 1:
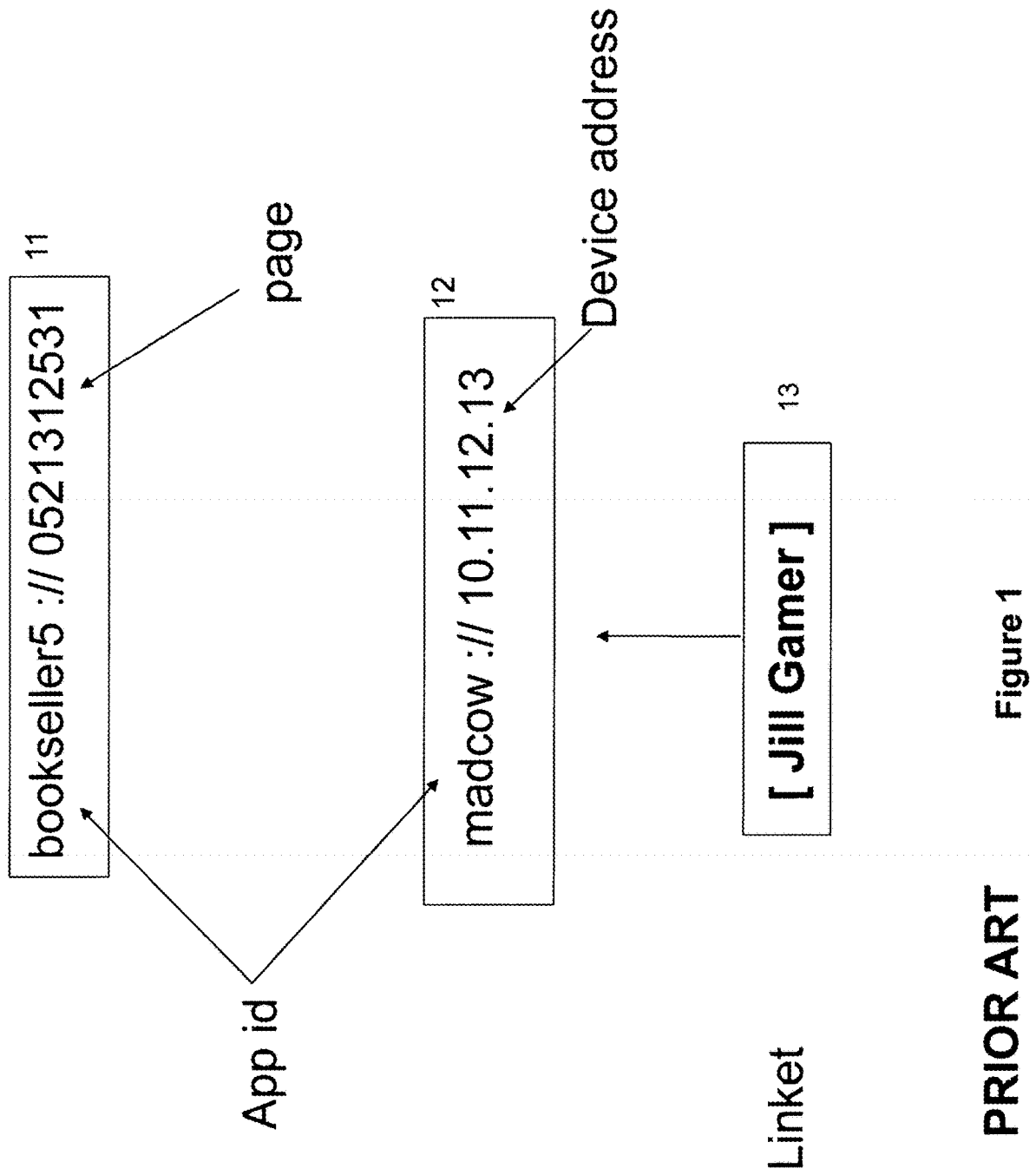
FIG. 1 shows the prior art of a linket.

This application has the following sections:
1] Linket;
2] Theme park;
3] Viewers affecting the park;
4] Other venues and activities;
5] Followers;
6] Skill levels;
7] Viewer games;
8] Reification;
9] Moving viewer;
10] Movie and park;
11] Anti-cheating;
12] Multiple Mixed Realities (MMR);

1] Linket;

FIG. 1 shows the prior art of a deep link and linkets. Item 11 is a deep link as commonly implemented. It is a string consisting of 2 parts. The first is an id ("bookseller5") of an app in a mobile app store. The second is an id of a good or service being offered for sale. The example id is an ISBN of a book. The app example is an app made by a bookseller. The "bookseller5" represents an actual alphanumeric id assigned to the app by the mobile app store. The id of the good or service can be considered to be a SKU (Stock Keeping Unit) or a page id. The latter is where the app is effectively a collection of items for sale, each item on its own page.

The use case of item 11 is as follows. A user Nicky is using her mobile device and running a first app. That app shows something that is the main purpose of the app. It also shows an ad for a specific book. This book might be considered appropriate given the context of what Nicky is seeing in the app. The ad is a deep link functionally equivalent to item 11. Nicky clicks the deep link, or a visual representation of the deep link. This triggers her phone to search its apps to see if the bookseller app given in the deep link is already present. If so, the bookseller app is run and it starts up not in the generic landing page but the page for the given book. If the bookseller app is not on her phone, the phone goes to the app store and starts the download of the bookseller app. It asks for Nicky's permission. Assuming she agrees, when the app is downloaded, it is automatically started in the page for the given book.

The deep link of item 11 solves 2 problems. The first is the manual search of the app store. Currently the Android.™ and iPhone.™ stores have 2 million apps each. Every manual step in searching the app store is a source of error. The user is fragile. She (likely) has no investment in time or money in using a specific new app. If she makes a mistake in the search, she can abandon her efforts. The second problem is that when an app is run by double clicking the app on the mobile device, it starts in its generic landing page. Nicky then has to search manually in the page for the item. Overall, both problems reduce the revenue made by the app.

The above use of a deep link is for a person interacting with an app server. Person to machine. To make a transaction.

Items 12 and 13 were invented by one of the applicants (Boudville) in 2015. Item 13 is a Linket.™. It is a Unicode string that is shown in a webpage or app as a clickable entity.

Analogous to a web domain. One use case is as follows. Imagine a gamer Jill. She want to make money by letting others watch her play a game (against computer opponents, say). Or by charging others to play her. She obtains a linket [Jill Gamer] from a firm running a linket Registry.

The linket itself is the contents inside the square brackets. The use of the brackets is an arbitrary choice of leading and trailing delimiters. Equivalent might be <Jill Gamer>. The delimiters do not have to be matching symbols, like %% Jill Gamer>. Here also, the number of leading and trailing delimiters might be different. The main issue here is that a specific choice be made for the delimiters. So users and software might recognise the linket.

It is not a requirement for both leading and trailing delimiters. The current use of hashtags only has a leading delimiter ("#"). But this means that there is no whitespace inside a hashtag, making it harder to read. URLs also have no trailing delimiter, and the same problem. Linkets having a trailing delimiter means that whitespace is possible, as shown in FIG. 1.

Jill can send [Jill Gamer] as a clickable link in email. A recipient, Bob, reads it in his mobile browser. He clicks [Jill Gamer]. A query goes from his mobile device to the Registry. The Registry replies with the deep link of item 12. Bob's device runs the deep link. It looks for or downloads the game app, Madcow, from the app store. The game is run automatically. It connects to a port at 10.11.12.13. At this address is Jill's game, listening for a connection. Her game might be another instance of Bob's game. The game could have several versions. Jill's version could be for a PC, on which she plays. While Bob's version could be for mobile.

Bob can now watch Jill. Or play her. A key point is that Jill could be using her mobile device. Her device connects to the Internet via a hot spot or phone carrier. It is assigned a temporary IP address (including a port). But her linket, like a domain, is unvarying. The linket is her brand, which she promotes to the world.

The interaction of the linket differs qualitatively from the deep link of item 11. The latter is for a person to server. The linket is for a person to person live interaction.

2] Park;

There are 3 meanings to "park" that we use. One is a park like Golden Gate Park in San Francisco, with landscapes and owned by the government. Another is an amusement park, with rides like rollercoasters, dodgem cars, go carts, carousels etc. A third is a theme park. For example, Universal Studios Corp. has a Harry Potter theme and a Back to the Future theme in Los Angeles. For brevity we will use "park" primarily to mean a theme park. But possibly the other types.

Visitors go thru the park and are entertained by a theme. See FIG. 2. It shows visitor Drew 201 with his mobile device 202. He is in park 200. Outside the park, is Laura 210 with her device 211, which could be mobile or non-mobile. In general, she is not in the same city as Drew and she does not know him. There could be others with Drew, but for simplicity, we currently consider only Drew as a visitor.

Near Drew can be cameras 203 and 205. There could be more. These can be emplaced in fixed locations. Some might be attached to moving devices. Drew could be walking, or sitting in a static location. Or in a moving device. Drew might appear in the Field of View (FoV) of a camera.

Near Drew can be an electronic screen 204, showing images or information. There might be several screens. So far, devices 203-205 can be considered purely electronic devices.

Near Drew can be an electromechanical fountain 206. As with the cameras and screens, this is controlled by the park. The fountain can be turned on or off remotely. When running, the volume of water in the jets and the heights of the jets can also be controlled remotely. Associated with the fountain might be a loudspeaker playing music, possibly synchronised with the height of the jets. There might also be lights of different colours shining on or through the fountain. Loudspeaker and lights can also be remotely controlled.

Device 207 is a chest of drawers. Some or all drawers might be locked and unlocked remotely. A drawer might have mechanical actuators that can open and close the drawer. Equivalently, instead of a chest of drawers, there might be a filing cabinet.

Door 208 might be a door that can open and close without manual operation by Drew. Or it could have a lock that is remotely controlled (in part). One type of door 208 could be a garage or warehouse roll up door.

Cart 209 can be controlled remotely. It could carry Drew and others.

Another device (not shown) could be a platform that rises or lowers from the ground. (This includes a lift.) Or it could be extruded or retracted from a wall. It could be an HVAC device, or part of one, that influences temperature or air flow. It could be a wave generator that affects the flow of water in an aquatic environment. It could be shutters for a window, that open and close. It could be a window that opens and closes.

The remote influencing of air flow can extend to controlling the rate of rotation (angular velocity) of a fan.

Another device could control the release of aromas in the vicinity of Drew. Triggers his olfactory sense.

Another device could be a loudspeaker whose volume or other audio parameter is adjusted. Or whose direction that the speaker is pointed in can be remotely controlled.

Another device might make a change detectable via tactile or haptic means by Drew. For example, there might be a panel in a wall that can be pushed in by Drew, where sometimes it is remotely controlled so that it cannot be pushed.

Another device might be a camera whose lens can be adjusted to pan, tilt and zoom. Or it might be a camera that can be moved, like along a rail.

Another device could move on the ground, or on a ceiling or wall. For example, it might be a giant spider that crawls along a wall and ceiling. Or it might be an elf that walks on the ground.

Another device might be a seat (that Drew sits on) that vibrates. Similar to what some movie theatres have.

Another device could be an enclosure (cage?) that holds a real or fake animal, where the enclosure could be opened to release the animal near Drew.

Another device might be a container holding a clue, perhaps a physical gadget. The device might open and release the clue depending on actions by Drew and others. A variant is where the clue is actually a reward (like a stuffed toy or a bottle of wine).

Another device could be a drone. Presenting an outdoors panoramic view of the park. The drone has a camera (or several). The drone and its cameras can be controlled by the park to focus on various sections.

There could be multiple such devices.

At present some or all of these cases exist. One characteristic is that the controlling of the devices by the park is largely based on preset decisions and perhaps by the actions of the visitors. It can be useful to the park if the experiences are made more unique. Giving incentive for visitors to come back for new experiences. But there is another issue. Parks have advertising costs for billboards, TV commercials and the like. In part to sustain brand awareness and to bring in new visitors.

Our application combines the parks with another recent phenomenon—esports. In the last 10 years it has become clear that people will pay to watch others play computer games. They will pay to watch in person (in a stadium) and remotely. It is the latter idea that is used here. The park uses cameras 203 and 205 to show static images and video to Laura. It can also use microphones (not shown in FIG. 2) to pick up audio and transmit to Laura's device. The microphones can be installed by the park in the vicinity of visitors. They can pick up words spoken by the visitors, and audio emitted by the park's loudspeakers.

In terms of visitors' privacy, the park can indicate to visitors that certain sections of the park have these cameras and microphones. And when the visitors go there, they consent to such uses.

An elaboration is possible concerning visitors' images. When a camera shows a visitor, it has software doing image recognition to detect this. It can blur the visitor's face. Or it can replace the visitor's face or also the rest of the visitor by a "skin"—an artificial image. Skins are a common concept in gaming, where a player can pick a skin. Those uses are often where the entire environment in the game is artificial. In the park, the skin can be a software overlay that follows the real person around in the video.

This can be extended. When Drew entered the area, he can have on his mobile device an app made by the park. The app could use a linket like [Medieval Visitor] if the theme is a medieval village. When Drew clicked the linket, the app was installed and run on his device. The app could offer him a choice of various cartoon personas—traveller, publican, smith, royal lady, barmaid, baker. (The persona he picks could be male or female.) Then in his wanderings thru the themed area, the video replaces him by his persona.

Or Drew downloaded the app without clicking on a linket. The park could have used other means to induce him to do this.

The app could let him have a nickname. In addition to his persona name, or in exclusive-or to it. So if there is a persona "Smith" (a metal worker), Drew might be "Wanderer Smith".

A third possibility is if Drew already has a linket, like [Mage Boy], for his activities outside the park. It is straightforward for the textual content of the linket to be copied into his nickname for the park theme.

There is another option if Drew has a linket. A linket maps to a deep link, which maps to an app and his mobile device address. The park lets Drew connect his linket to an app, Theta, made by the park for linket users. Drew goes on his device to the Linket Registry and connects [Mage Boy] to Theta. It can have similar overall functionality as the viewer app, discussed below. (Or be the same app.) The point is that Drew likely has already publicised [Mage Boy] on the web or social media, prior to arriving at the park. Hence a fan of Drew can click [Mage Boy] on a webpage on her phone, and load the park viewer app. Drew brings his fans with him, remotely, into the park. This benefits the park.

Figure 3:
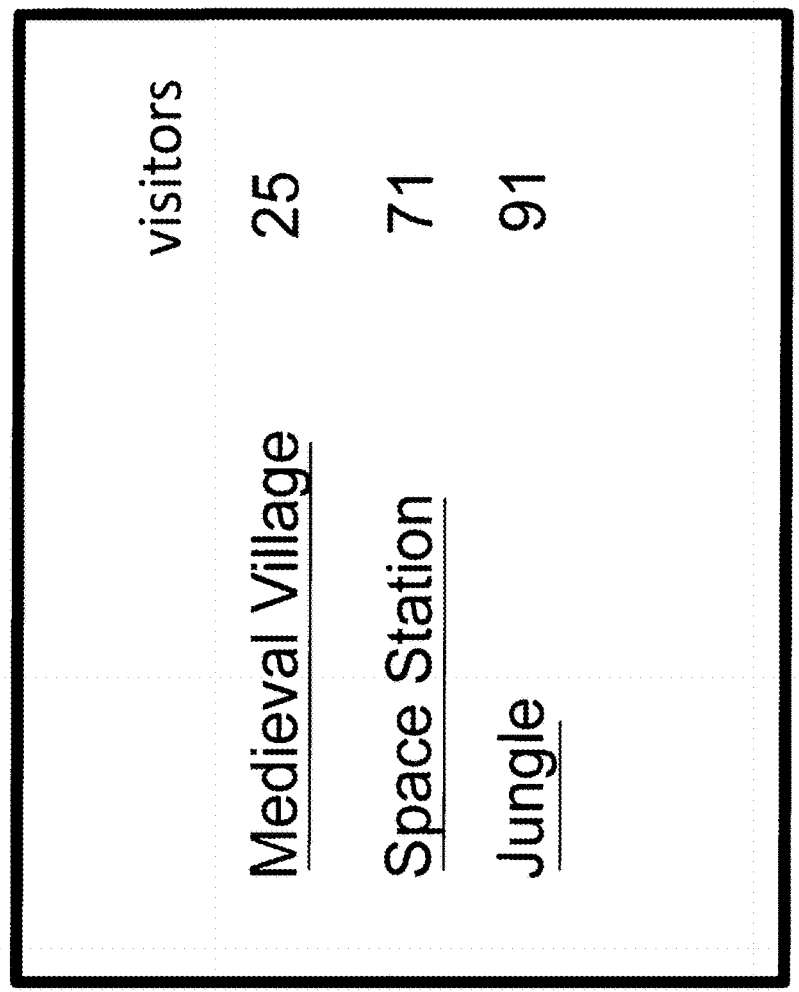
FIG. 3 shows a viewer app, with themed areas of a park.

The park can have a different linket directed at viewers outside the park, like [Park Viewer]. This can be on a webpage for the park. Laura visits the webpage. She might be in a different country. By picking the linket, the app runs on her device. The app can show different themes for the park, if it has different areas for different themes. See FIG. 3. It shows viewer app 31. The park has 3 areas. Each is clickable. For each area, the app shows the current number of visitors.

The linkets for viewers could differ by language. A linket for a viewer in Brazil might be in Portuguese, while another for Mexico can be in Spanish. Both linkets might map to the same app. Where an instance of the app that was linked to by the Brazilian linket will depict text in Portuguese.

Laura picks one that shows the themed area where Drew is in. (She does not know him.) Suppose this is the medieval village.

A variant is where the park has 3 linkets—[Park-Medieval], [Park-Space Station] and [Park-Jungle]. Each maps to the same viewer app. But goes directly to the themed area chosen. So the step of Laura seeing FIG. 3 can be omitted. A similar set of linkets can be used for Drew, so he does not have to pick the themed area.

In general the viewer app and visitor app are different. But a park could merge both into one app. One consideration is that the visitor app is for a mobile device. The viewer app can have several versions—for mobile and fixed devices. Because the viewer can be walking around with a mobile device, or sitting down at a PC, for example.

Laura can remotely see and perhaps hear Drew and others as they progress thru the village. The park can offer different views to Laura. One might be a map view, instead of images. The visitors are shown as various icons. The app can show the various devices in the area. If the area has a game approach, where the visitors compete to complete tasks, Drew's and Laura's apps can show the competitors' progress, if this is meaningful.

The viewer app could let Laura search the visitor data for some criteria. One is to show any visitors who have their own linkets. These users might be media influencers and could be interesting for Laura to follow them thru the park.

It is a short distance to let Drew's visitor app control some of the electromechanical devices. This increases interactivity by him. He is not just passively walking or riding thru a themed area. For example, the area could have a room with a locked door. Drew uses his app to answer some questions based on what he saw (or did) earlier. If correct, the door unlocks.

The park can monetise the viewer app by showing ads. These can include offers to buy a ticket to the park. Or to other parks owned by the same firm. With a possible discount as an inducement. If the park has associated items for sale, like toys or movies, these can also be shown on the viewer app.

To encourage use of the viewer app, there could be a message board. Current viewers can write messages viewable by all or some viewers. This interactivity improves stickiness of the app.

The viewer app and the visitor app might have the same server.

3] Viewers Affecting the Park;

The previous section combined esports with a park. Where, perhaps via a possible use of linkets, a viewer can watch visitors interact with the park. Like most if not all esports, the viewer (or fan) cannot alter the environment in which the visitor (or player) is in. Esports often lets a fan message the player. Or donate money. Players like this because of it builds their audience and they make money.

There is a potential problem if viewers can contact visitors thru their apps. If Laura has been in the park, or if she has watched others, she might act as a spoiler. Giving hints (helpful or misleading) to Drew.

This section goes beyond esports. The park can let some of its devices be controlled by the viewer app. The park can charge a premium to let Laura access controls in her app to do this.

Figure 4:
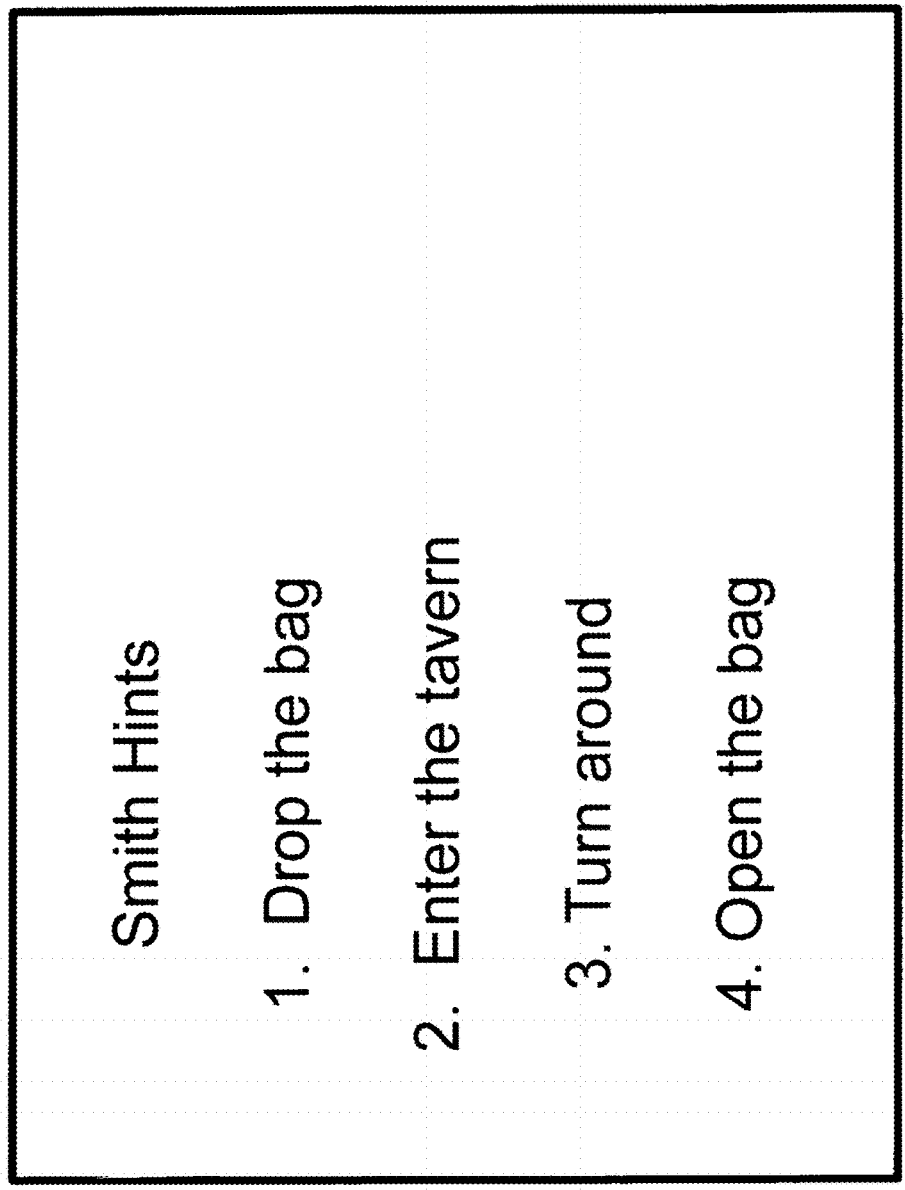
FIG. 4 shows a viewer app with suggestions for player Smith.

Consider FIG. 4. Laura can use her viewer app 31 to show a message on screen 26, addressed to the visitor with persona Smith. Her app offers 4 choices. She can only pick one.

Caution. The viewer app should not typically let the viewer write arbitrary text to be shown on a screen in the park, or in a visitor's mobile app. There is likelihood of a mischievous viewer writing profanity. FIG. 4 restricts tightly what Laura can do.

Or the message picked by Laura could be broadcast on a loudspeaker near Drew. The voice from the loudspeaker might not be Laura's, but pre-recorded audio made by a park employee. Or made from a computer by Text To Speech (TTS).

One extension is if the server knows the location of the visitor playing the Smith persona. It could show the message on the closest screen or play it on the closest loudspeaker.

Another example is where Laura's app lets her open a door to a room containing a clue or reward. Her app could also let her send a (probably pre-designated) message to one or more visitors. The app shows the names of their personas or the nicknames they took when they started.

Conversely, her app could let her close and lock the door. Presumably the visitors would have other means to open the door. Or the task might let them move on and do other tasks. Laura's locking of the door might be a hinderance or an aid to the visitors.

Figure 5:
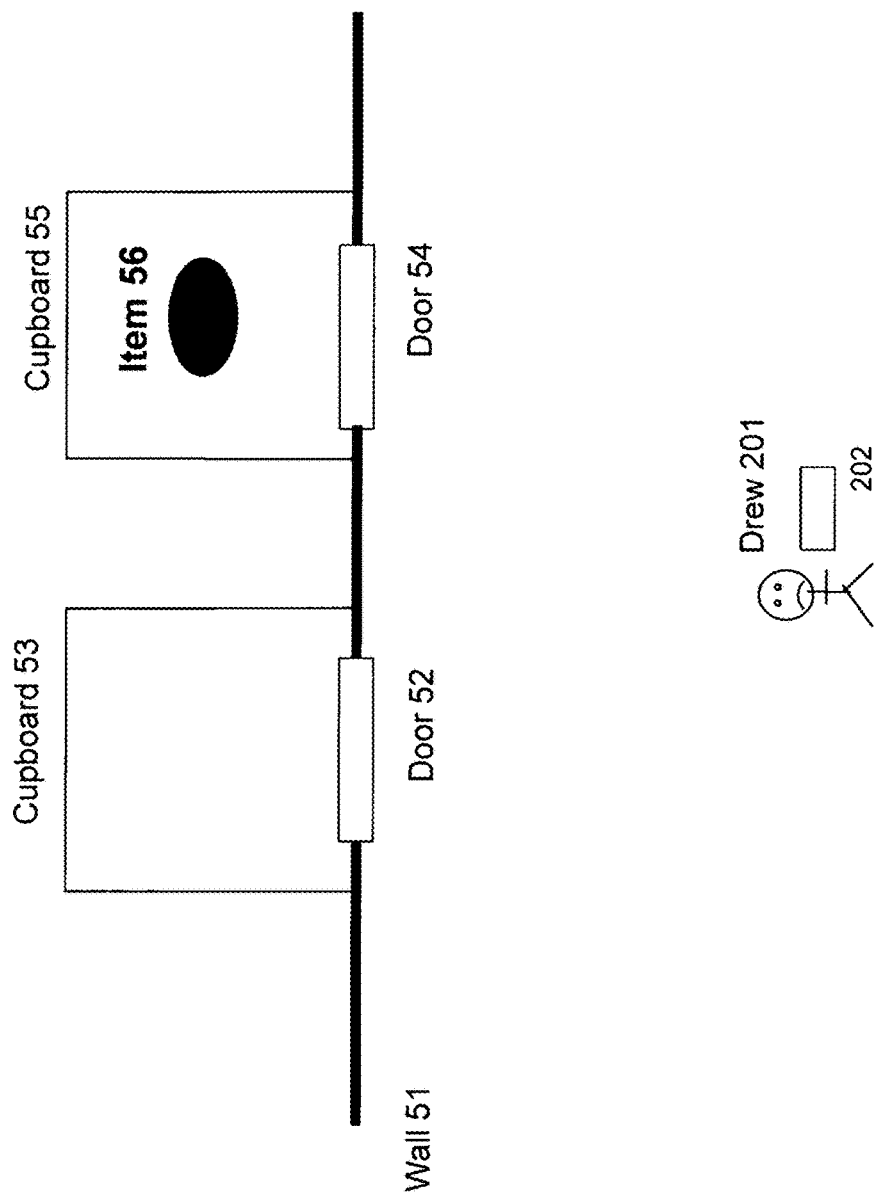
FIG. 5 shows a visitor in front of 2 cupboards, 1 with an item.

FIG. 5 shows Drew 201 and his mobile device 202 near wall 51. There are cupboards 53 and 55 in the wall. Cupboard 53 has door 52 and is empty. Cupboard 55 has door 54. It also has item 56. Both doors are closed. Drew is looking for item 56. He knows what it is but not where it is. Or he does not know what it is or where it is, but if he saw it, he might be inclined to take it or use it. Thru her app, Laura can see that item 56 is in cupboard 55 and the other cupboard is empty. Drew does not have this information on his app and the doors are opaque.

Suppose that Laura wants to help Drew. (Maybe she's on the same team.) But she cannot message him. There are several things she might be able to do. Suppose door 54 is locked and she is able to unlock it but not open it. She does so. And hopes that when Drew goes near door 54, he will try it and open it and see the item.

If she can open the door via her app, she does so. Increasing the chances that Drew will see the item. Suppose both doors are unlocked. They are currently closed. And she cannot open door 54. But she can open door 52. She opens door 52. When Drew is nearby, he can see into cupboard 53 and see that it is empty. By default he can immediately try to open door 54. Hopefully.

If cupboard 55 has a light and it is turned off, Laura might turn it on, if she can. She could also do so for cupboard 53, to help Drew easily see it is empty.

So far, Laura has been trying to help Drew. Cooperative behaviour. But suppose she wants to hinder him. Antagonistic behaviour. Maybe she is on a competing team. Suppose door 54 is open. She closes it, to make it harder for him to find the item. If she can lock door 54, she does so. If door 52 is open and she can close it, she does so. If she can lock door 52, she might do so. If door 54 is open, and she cannot close it, she might turn off the cupboard light if it exists and is on and she can turn it off.

Consider item 56. Suppose Laura can move it in the cupboard. If she is helping Drew, she might move it closer to the door, so that it is easily visible when the door is open. (The park can restrict the item to prevent her moving it outside the cupboard.) If she is not helping Drew, she can if possible move the item deeper into the cupboard and off to the side. So if the door is open, there is a narrower FoV showing the item from the outside.

Figure 5A:
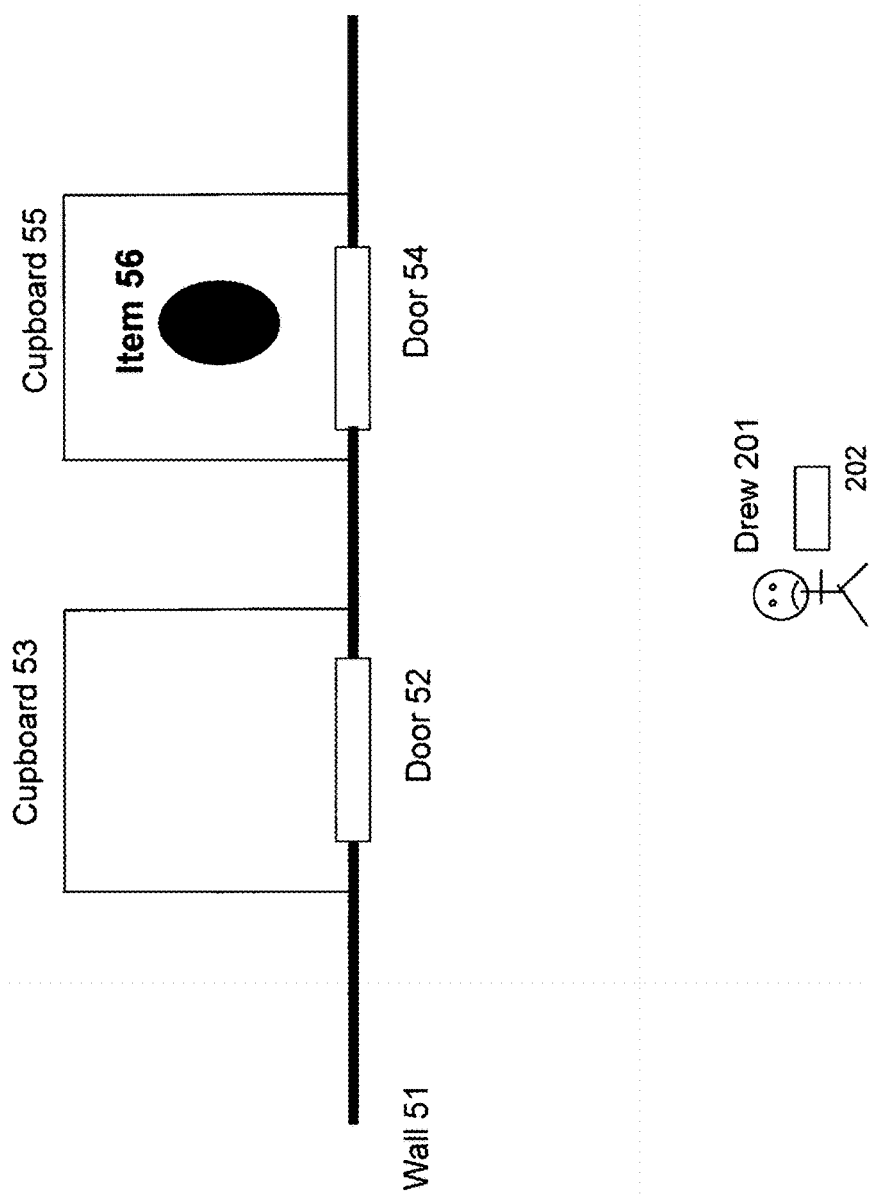
FIG. 5a shows the item rotated with a narrower cross section.

One variant is where Laura reduces the visible cross section of the item by moving and rotating it as in FIG. 5a. The item is imagined to be roughly ellipsoidal. FIG. 5a is where Laura has rotated it to a narrower profile when viewed from outside.

Another variant is where the item has one side that is mostly one colour, e.g. Grey or black, that will blend with the surroundings in the cupboard. Laura could, if able, move or rotate the item so that this side faces the outside of the cupboard.

Item 56 can be physical or virtual. If virtual, it is possible for the software that positions the item in the cupboard to let Laura move it. So it will be harder for Drew, using his mobile device, to see the item in the FoV on his screen. If the item is real, it has some wheels or other mobile mechanism that Laura can access and control.

The doors themselves might be hard to find. They could be flush with the wall and blending with it, with no protruding elements like a handle. In this case, the most crucial aid Laura could give is to open the door 54. While a hinderance might be to close the door.

Essentially, a viewer helping a visitor will make an item more accessible and visible. A viewer hindering a visitor will make it less accessible and visible.

FIG. 5 is for 1 desirable item in 1 receptacle, the other receptacles empty. There might be items in each cupboard. But only 1 item is useful to Drew. And Laura's app tells her where that item is.

FIG. 5 can be applied to other geometries. Instead of cupboards, there is a metal filing cabinet with drawers. Each drawer has a separate lock, remotely controlled. One drawer has an item, physical or virtual. Other drawers might be empty.

By letting Laura directly altering a device onsite, this closes a feedback loop largely absent in esports. It offers more engagement for the viewer.

This feedback feature also borrows from the idea of an obstacle course which can be viewed and controlled remotely. The popular Hunger Games books and movies were a fictional depiction of this scenario. The trope offers a suggestion that the park redesign some of its themes to enable competition. Currently in parks, there is relatively little competition. Perhaps so anyone could visit and experience all the themes. But the park might find it productive to have a theme area be used for 2 audiences. One general. The other being experienced players, who perhaps have to complete a course in minimum time. Or some other equivalent and challenging requirement. This can increase audience interest and involvement.

So far, we described one viewer. Suppose there are several viewers. And several want to alter a given device. Consider FIG. 4 where each of the messages to Smith has a different number of viewers picking it. A vote can be done. The most popular message gets sent to Smith.

A variant is where there are several devices near the visitor, and changes to each can affect him. The votes can be to pick one action by one device. Or in some circumstances, the park could let several devices change state at the same time. The most popular commands for those devices can be found, and the devices do the commands. So a door near him can open, and a fountain near him can lower its waterspout.

A variant is where the park wants to see more choices shown to the visitors, and not just the same most popular choices each time. So if "Drop the bag" is the most popular, it is sent to persona Smith. But there can be a lock out period of, say, 1 hour, where this message cannot be sent again to Smith. (Presumably the person being the latter Smith differs from the person who was the earlier Smith.)

Another means of encouraging repeated interactions by a viewer is to let her have a nickname. If she has a linket, the viewer app might ask for that, and use it as her nickname. Or she might pick a different nickname. Laura might pick "Girl Angel". Then if she is the only one to pick a message to be sent to Smith, the message could indicate the sender was "Girl Angel". Or if she and several others picked a message for Smith, all the senders (perhaps up to some cutoff like 50) could be shown to Smith.

The server could record each time that Laura caused a device to interact with the visitors. This can include each time that she voted with others for an implemented interaction. Similar to how some message boards list the number of posts by a user. Users with a large number could garner extra privileges. In the context of the park, Laura might get a larger discount on items like a park ticket. The total number of times for her could be more than just a simple talley of successful interactions she was associated with. For example, if she made the only vote in FIG. 4, then this could be counted as a multiple in her total. The reasoning can be that she activated an unusual event, giving rise to more variability for visitors.

Giving more recognition to active viewers encourages liquidity in this "marketplace". And because viewers do not travel to the park, it is easier for them to repeatedly interact. Whereas visitors have a greater physical effort to go to the park.

The use of real devices that can be manipulated by nearby visitors and remote viewers also permits instantiating a popular trope from fiction. A ghost goes into an object and makes it alive. In the context of a park, the ghost is a virtual entity seen thru the devices used by the visitor and viewer. Akin to the monsters in Pokemon Go. The visitor chases the ghost. It can be shown as going into a nearby physical object, like an electric cart, which now turns on and starts moving. Or into a fountain, that turns on its water jets and turns on lights that play a visual pattern onto the jets. Or into a haunted Halloween room, where now mechanical spiders crawl along the walls and descend from the ceilings. See Section 8 for more discussion.

While outside the object, the ghost could be manipulated or affected by actions done by the visitor or viewer.

Seen through this lens, the actions in FIGS. 5 and 5*a* can be re-narrated. The actions of Laura when she helps Drew can be depicted on their device screens as her guiding a friendly ghost to the cupboards. Where the ghost performs what physical actions it can to help Drew get the item. Instead of Laura manually doing steps on her device to pick the cupboard holding the desired item, unlock the door, open the cupboard door, turn on the cupboard light, move the item to be more visible, these could be done as lower level subroutine calls by a program shown as a ghost on Drew's device.

These can be reinforced by visual and audio cues. For example, if the door is unlocked, there could be LED lights around the door handle that light up, and a speaker could play a loud clicking sound. If the door is opened by the ghost, the speaker could play creaking, squeaking sounds.

There is a qualitative difference between this park interaction and esports. It is rare or non-existent for viewers to alter an esports game. In part because popular games are twitch games. This refers to reflex games, like First Person Shooter (FPS) games. There is little time for viewers to act, which may be why this has been rarely implemented for esports. For a park, visitors typically interact with surroundings at a much slower pace. The exception are fast paced roller coaster type interactions. But those are often linear, in that the visitor passively goes thru the interaction, and the interaction is largely the same for all who start it.

Another benefit to the park for involving external viewers is that this opens up a new business. The park spends much to design and make the themes. By having viewers, the park gets a second customer base at relatively low marginal cost. It does not have to buy more land. A key consideration because the park is likely in a major metropolitan area, chosen because of the large population that can visit it.

Because viewers can be anywhere, this includes them being in smaller towns, and in developing countries. Many people in the latter cannot afford to visit something like a Disneyland Paris. The park can increase mindshare and brand awareness to hundreds of millions of new potential customers by offering a vicarious experience. If a theme at the park is taken from a movie, or there are associated toy products for the movie, these are far more affordable for viewers in developing countries. Thus remote viewing actions can also act as mindshare advertising for these cheaper products.

If there are many viewers and the visitors in a theme area are competing with each other, another possibility arises. Viewers can back a visitor. Teams can arise. A visitor's viewers can help it. Perhaps in part by hindering other visitors.

One issue is how teams form. A team might have operated in an earlier contest and decided to reform for the current contest. Here, in general, the visitor they back is different from the earlier visitor. The viewer app enabling team members to communicate can be crucial in a team forming and acting together.

A team could furnish the visitor it backs. The team is formed prior to the contest, and likewise it knows a person willing to play. He shows up with backing support. Not all viewers would be required to back a visitor. Many viewers might just play a passive role and watch. The existence of viewer teams gives added depth to the contest.

As inducement for teams to form and function, the park could let a winning team get a prize. The park designs the contest so that intermediate results (who is currently leading, etc) can be found and posted on the apps.

An extension is where a team has several visitors.

An extension is where the app or apps that the viewers and visitors use can have extra messaging options available to a team. At the simplest level, the app can let all members of a team message each other. Earlier we described how messaging with arbitrary text content between a viewer and a visitor might be restricted. But when they are on the same team, that is or can be a crucial need for the team.

One special case is where the team is one remote viewer and several visitors. The viewer might be the team leader who coordinates the activities of the visitors.

Thus far, we discussed how viewers can affect the visitor experience. If they are on the same team, the viewer helps the visitor get clues or rewards. The park can also let a visitor benefit viewers following him. Drew can be near a physical box. He opens it manually. The park can detect this action and attribute it to Drew. Maybe by him doing a related action on his mobile device—pressing a button to this effect in his app. Or by correlating his location as given by his device with any images of him from the park's cameras. The action releases rewards to his followers. If some are on his team, the park could let him restrict the rewards to the team. And perhaps to specific members of the team. The rewards might be abilities that can be used by the viewers to control remotely the park devices. Or perhaps discounts on merchandise sold by the park.

4] Other Venues and Activities;

Escape rooms have become popular lately. An escape room is a room, or a set of adjacent rooms, in which visitors are confined. They have to deduce how to leave, based on clues in the room. One problem afflicting this genre is scaling. The revenue is limited by how many people take part. By implementing some of the methods of the earlier sections, the room can have a remote viewer audience. Viewers can interact with visitors through electronic screens in the room, and via apps used by the viewers and perhaps by the visitors.

Electromechanical devices can also be used. Though compared to theme parks, escape rooms have a limited budget. It is likely that purely electronic devices, like screens and cameras would be feasible for many rooms, compared to electromechanical devices.

Scavenger hunts have been played for decades. Recently thru the use of mobile devices, the games Ingress.™ and Pokemon Go.™ have been globally popular. Both are examples of Augmented Reality (AR) games. For Pokemon Go, the player goes to various locations in a city. At some are monsters, which the player can capture via her phone. But the monsters only exist in the game server and in mobile apps. The real world background is unaffected. Such games are currently quite limited.

Future AR games can be designed, perhaps to be played in part or entirely at a park. The park modifies its devices along the lines described earlier. It can cater to players of an AR game by offering an enhanced experience, compared to playing outside the park. Now, when a player does something in the game, changes happen both in the AR overlay and in the physical background. This might be called Mixed Reality (MR). A far richer interaction. Plus having remote viewers being able to alter the physical background increases the variability and uniqueness of the game play.

Our meaning of MR in this application also takes it further in functionality than what some MR proponents are defining as MR. Current MR devices include the HoloLens.™ by Microsoft Corp. and a device by Magic Leap Corp. Both let a virtual entity respond to its physical environment. Like a virtual monster that moves behind a real desk near the player of a game, to hide from a player. The player is wearing an MR device that shows the monster and the real environment. The depiction of the monster is modified depending on its 3 dimensional surface being treated as partly or entirely occluded (blocked) by real objects.

In this application, one example is where a viewer can see via her app all the monsters in the theme area, but the visitor cannot. The game can let a viewer guide a monster to evade capture from a visitor. The game deliberately outsources some of a monster's actions to be controlled by viewers. If several viewers want to control a monster, then as above, the different actions that the monster can take are voted on by the viewers.

In related ways, a viewer (or viewers) can alter the physical neighbourhood of a monster, to conceal it from a visitor. The viewer might have a (real) box moved, so as to conceal a monster behind the box from direct line of sight of a visitor moving in a given trajectory. An elaboration is where the viewer moves the box, and then moves the monster to be hidden behind the box. This is a crucial value add that the park offers the game and its gamers. Outside the park, in general it can be expected that if a game has remote viewers, they cannot cause gross changes in devices near the players, who are not in the park.

Another example involves a viewer distracting a visitor. The viewer might activate a loud sound and vary the lighting in an area, to make it harder for the visitor to search for a monster. Or the viewer can cause a pleasant aroma (like from cooking) to come from an area. To induce the visitor to go there, and away from other places holding monsters.

Another activity is cosplay. Costumed play. Typically fans dress up in costumes inspired by manga, anime or science fiction movies. A park could have an anime inspired theme area. Visitors in costume might be eligible for a cosplay specific app. And various tasks or clues in the area are chosen to have deep contextual appeal to them. Plus, viewers can access a cosplay specific app.

For the scenarios in this section, remote viewers using an app have one possible advantage over visitors. The visitors are in an augmented reality scene. They cannot avoid seeing the physical reality around them. Though this can be mitigated by having the surroundings be dressed up according to the imaginary plot. But viewers are looking at it entirely via an app. The app can overlay and edit out any non-conforming images. For the viewers, it can be virtual reality, not augmented. VR, when done well, is generally acknowledged as being more compelling than AR. Taking this further, the visitor might wear a Heads Up Display (HUD) that enables MR.

5] Followers;

Viewers can follow a visitor. The viewer app has a list of visitors willing to let viewers follow them. The park can let the visitors opt in or opt out of this, perhaps thru the use of a visitor app. The viewer app could have in that list of visitors, a number next to a visitor, indicating the number of viewers who are following him.

Just like a visitor can have a nickname or handle, so too can a viewer. The viewer's handle can be the same across different remote visits to the park.

Visitors and followers can rate each other. If a visitor has several followers, and those can interact remotely with each other, the park can let a follower rate other followers, who are following the same visitor. The latter condition is to try to have the ratings be meaningful. Whereas if Sue and Jill are viewers and follow different visitors, a rating that Sue gives for Jill might be meaningless.

A visitor can see the nicknames of those following him. If a follower does not have a nickname, this can be shown as blank on the visitor's app. Or if a follower does have a nickname, the follower might have an option of being anonymous.

The visitor can have a nickname or be anonymous. If the latter, the park might assign the visitor eg. anon15, to distinguish him from another anonymous visitor anon31.

If a visitor has followers, he might be able to delete some followers. Perhaps he had negative experiences with them in earlier visits. Or a follower can have a reputation based on feedback from other earlier visitors she followed. Suppose the feedback is given as a number from 0 to 5, where 5 is the highest rating and 0 the lowest. The visitor app could have a threshold set by the visitor, like 3. This means that viewers who want to follow him need a rating of at least 3.

Figure 2:
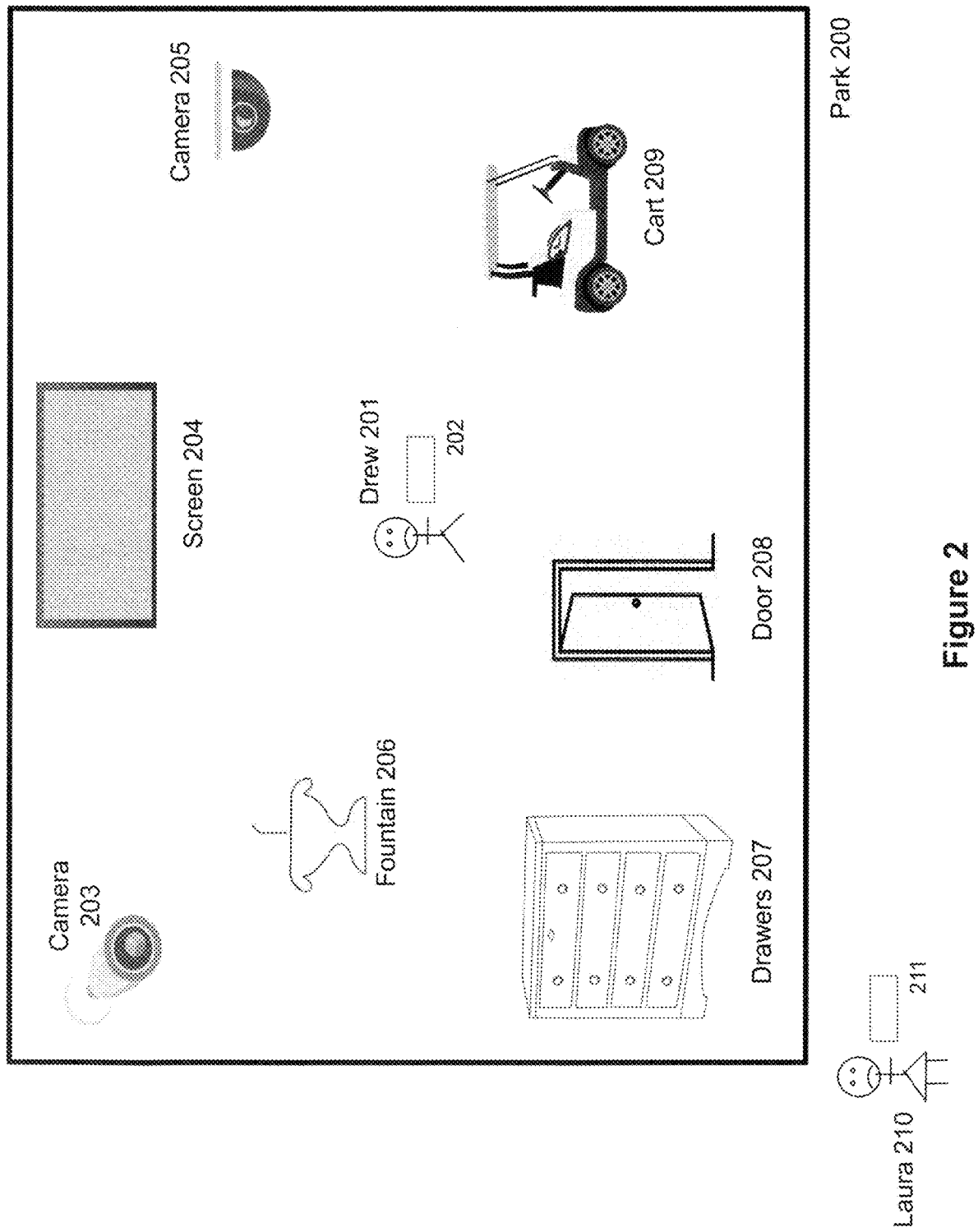
FIG. 2 shows a park with a visitor, a viewer and devices.

Suppose in FIG. 2 that viewer Laura is following visitor Drew. How can this be done? The park can use its cameras and drones and image recognition to track Drew. It is now in 2018 well known that China and UK have extensive security cameras and software powerful enough to identify individuals in crowds, with high confidence. Similar abilities for parks are possible. A park could also use other means, especially indoors, to track visitors. A beacon based method, for example. Several beacons are stationed in the park. The visitor's mobile device interacts with the beacons. Or the visitor might be given a physical tag to wear upon entry to the park. The visitor's location can be detected via the tag interacting with transponders emplaced in the park.

The viewer app can show a map with the locations of the person the viewer is following.

The viewer app can also show images of the visitor taken from the park's cameras. The image could be a skin overlaying the face or other parts of the visitor. The visitor could tell the park, perhaps via a visitor app, what the viewer sees of the visitor.

In general, the park could make several of its cameras available to viewers. To see the edited video, and perhaps to give temporary control of the camera to a viewer. It can be expected that there will be several viewers who want to control a given camera. How can a viewer be picked?

First. One way is random selection amongst viewers.

Second. A viewer pays with currency or with a special currency used by the park. Or with a virtual good that the user has.

Third. Priority can be given to viewers following visitors near the camera. (What near means can be set by the park.) This can be due to a visitor and his followers looking for clues (scavenger hunt perhaps), where they want to scrutinise closely a given area. This can thin down the eligible viewers.

Fourth. A viewer who wants to use a camera can be asked via her app to specify what direction (azimuth and elevation). Across all viewers who want to use the camera, a polling can be done to find a direction that will approximately satisfy as many as possible.

When the camera takes a photo or video, this might only go to the picked viewers. Or it could go to all viewers who wanted the camera.

The viewer app can have an option to ask the visitor app to take a photo or short video of the visitor (with the latter's agreeement) and then send it to the viewer. Possibly, the images can be altered via the park's servers to show the visitor in his chosen skin or persona. Likewise, the visitor app can have an option to ask the viewer app to take a photo or short video of the viewer and send it to the visitor. These actions might be linked. A photo or video of the visitor is allowed by the visitor only if he can also get similar from the viewer.

The viewer app can have an option to ask the visitor app to take a photo (or short video) with a camera on the visitor device that is on the opposite side of the screen. This is often the most natural way for a user to take a photo of his surroundings. If a short video, the visitor app might have a default suggestion of a pan of what the visitor is seeing. This helps the viewer get an idea of the surroundings of the visitor.

The viewer app can have an option to ask the visitor app to take a zoom in or zoom out photo in a given direction.

Figure 6:
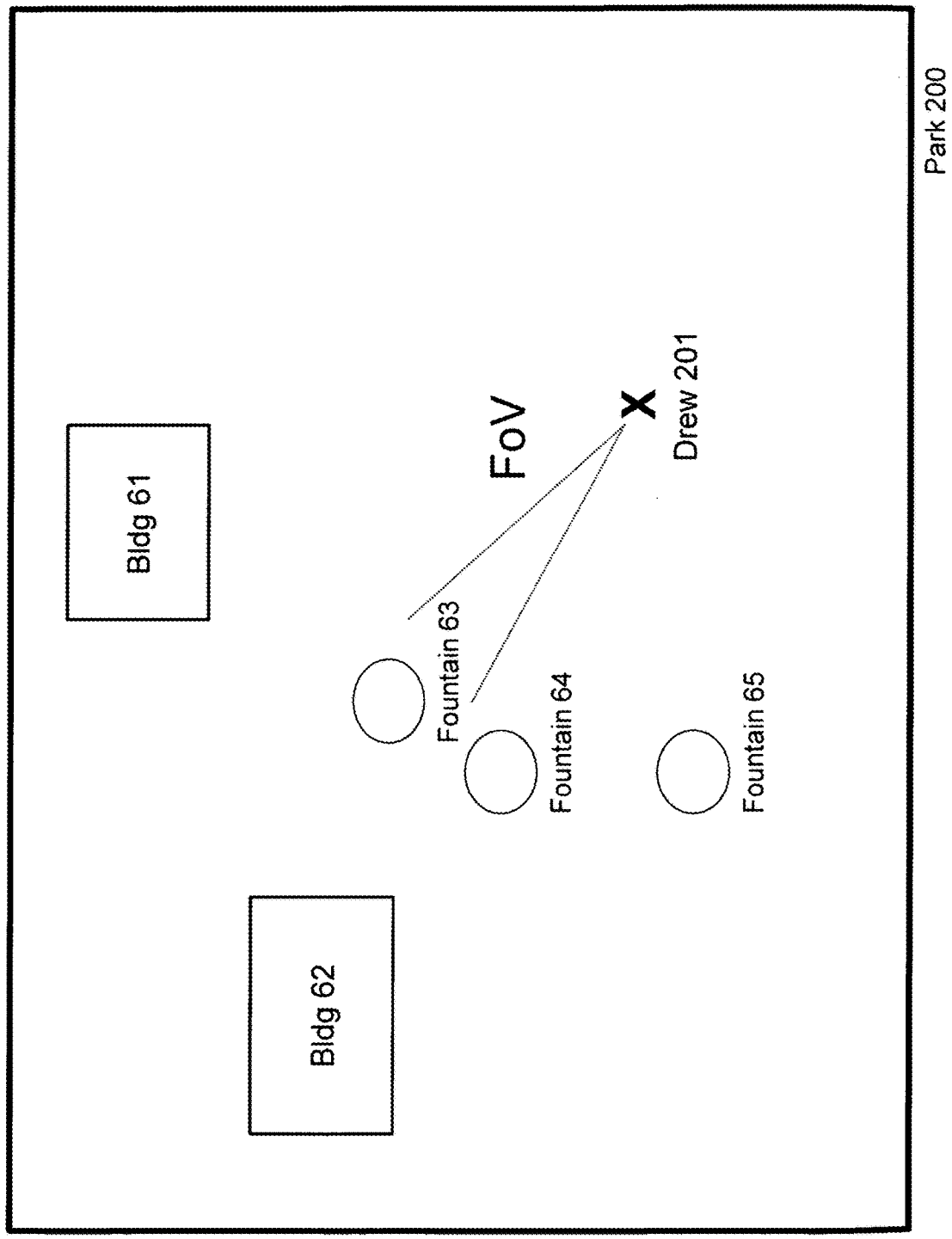
FIG. 6 shows a map of the park and a suggested Field of View.

Some steps can be automated. FIG. 6 shows a map of park 200 with buildings 61 and 62. And 3 fountains 63, 64, 65. (Not to scale.) X marks where Drew 201 is standing. FIG. 6 is shown in Laura's app. She wants Drew to take a photo of fountain 63. But Drew sees 3 fountains. How can she simply and unambiguously tell Drew which fountain? In general, in his phone, he will not be looking at the map. In her app she picks fountain 63. There is an option to convey this to Drew's app with instructions to take a photo of 63. Drew's device knows its location via GPS. And the park knows Drew's device location (his app tells the park). The park knows the location of fountain 63. Hence the park can make the vector from his location to 63. That information is sent to his app. Along with instructions to take the photo in the direction of the vector. If his device has a compass (reasonable for current mobile devices), it has enough information to start a camera (probably on the opposite side to the screen). The screen might show the image seen by the camera, as well as information about how to align the camera. When aligned correctly, the screen shows the desired fountain 63. This helps Drew take the right photo.

The lines in FIG. 6 emanating from Drew's location indicate the guidance given to his phone to orient its camera. The lines are the recommended FoV.

These type of interactions can be useful to encourage a community to arise via cooperative behaviour.

The apps can let the users talk—live audio—but not show images of the users.

The viewer app might or might not be able to follow several visitors simultaneously. One reason might be to reduce the chance of cheating, if there is a game scenario where the viewer gets information from one visitor and relays it to another.

The viewer app could let the viewer exchange messages with a visitor being followed on the app. The visitor could have an option to only let certain visitors that he picked, be able to message him.

When Laura follows Drew, she has a viewer app and he has a visitor app. (These could be the same.) The apps can talk to a common app server, and thus the apps can interact with each other. Equivalently the viewer app has a viewer server, and the visitor app uses a visitor server. And the viewer and visitor servers communicate with each other.

Laura and Drew could trade virtual goods. This gives incentive for each to keep visiting (in real life or remotely) the park. Trading includes gifting. Suppose Drew is in a fantasy theme, with magic potions and gold and swords being used, but he does not have a magic potion. He needs one to continue. Laura might have the potion. Maybe during a earlier physical visit to the park, she found it in a scavenger hunt. Or during her current following of Drew, she can buy one from the park via her app.

This also shows a useful feature that the park could implement. A visitor could find or acquire in some way virtual goods during a visit. He can retain these after he leaves. This is easily done via the park server having a record of the real identity of Drew, which could be the primary key in a database. Other fields for this key could be the ids of chain mail, leather mail and a magic helmet.

Some virtual goods might be more akin to services or abilities. One good might open or close a physical door in the park. Or to lock or unlock that door, while still keeping it closed. Going further, suppose the park has several such doors, Alpha, Beta, Delta. One good is to open or close Alpha. It does not work on other real doors. Another good locks or unlocks Beta.

Or suppose the park has several doors. Some are red. Some are green. A good could be a "key". A red key will open any red door, and likewise for a green key.

An extension is that a good, like a key, might only be able to be used for a maximum number of times remaining. So a given red key might only have 4 more uses, while a given green key has 10 more uses.

An extension is that a good, like a key can have, in addition to the maximum number of times left, a maximum number of times it can be used in a day. So the green key that has 10 more uses can have a daily limit of 3 uses.

A good could have an expiration date. To encourage use of the good. A variant is if the good has a maximum number of uses. This maximum could decrease over time.

The park could restrict the use of virtual services to only users currently in the park (=visitors). This incents a visitor to return. Or to remotely give or sell it to another person who might currently be in the park.

One extension is suppose Laura has a (virtual) magic helmet that she got in an earlier visit. The park lets her sell it to Drew, who is in the park right now. Can she sell or give it to Ralph, who is not currently in the park? This is up to the park. If the park allows it, this can give rise to a liquid secondary market. Which can be considered positive by the park. Or the park could forbid it, to induce Laura to revisit or to view the park.

A key point is that this differs from traditional video games, where all the items alter other items purely in a virtual world. In this application, the park can put some of its electromechanical devices under the control of virtual services. And those can be controlled locally or remotely.

Return to viewer Laura following visitor Drew. They could trade. Perhaps in Drew's current visit to the park, he picked up a parchment of healing and a crystal ball. Both are virtual goods. He needs a magic potion. He sees in his app that Laura has the potion. He contacts her via his app and offers his parchment for her potion.

Returning to when a viewer wants to follow a visitor, the viewer could show a list of virtual goods she has, or a subset of that list. The visitor can decide whether to let her become a follower based in part on seeing that list. Various steps can be done to ease this process. The viewer's virtual goods are all in the park's database, associated with an id of the viewer. Thus her app could have a button "list all". When she ticks this, all her goods are listed to the visitor's app. While if she only wants to offer some, her app lets her explicitly pick those.

Likewise suppose Drew is at a point in his journey thru the park that he needs a magic cloak. Given this, his app can easily search the inventory of his followers. Any with a magic cloak are shown in a list of useful followers. This reduces the cognitive and manual burden on Drew.

More generally, suppose Drew is at a point in his journey thru the park where he faces an obstacle. Perhaps a fountain that needs to be turned off so he can proceed by it. The park lets him broadcast to all viewers, asking who has a key to the fountain? He might offer something in return from the virtual goods he picked up today and in earlier physical visits to the park. The virtual goods could also include those he got as a remote viewer, by trading with visitors. Or by buying directly from the park.

One possible use of followers by a visitor is to carry virtual goods. A theme area that Drew is going thru might limit him as to the maximum number of goods he is carrying. If he goes to a location and sees a desirable virtual good, the park can find out what he is already carrying and forbid this. But it could let him 'give' some goods he is carrying to a (trusted) follower. He then picks up the new good. Later, he can ask the follower for his good back. It is up to the park whether to let the follower renege and keep the good.

Virtual goods might be combined with real goods. Imagine a teddy bear in a box. The bear is a prize. If Drew completes several tasks or finds several virtual goods, these might be used in opening the box. Whereupon he wins the bear.

The reader may see similarities between the followers of this section and the team of an earlier section. To some extent, and for some uses, the distinction between follower and team is arbitrary.

Figure 7:
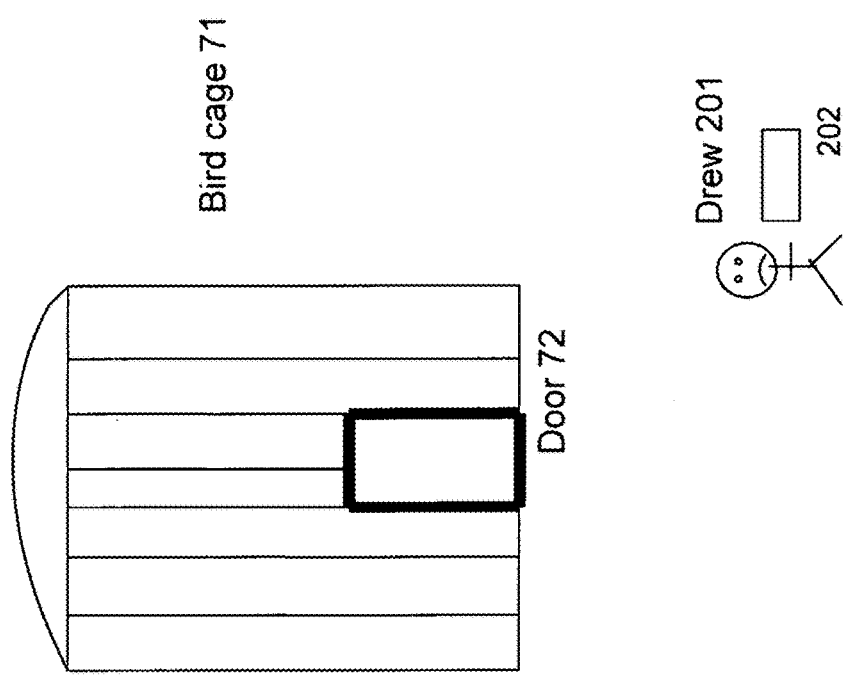
FIG. 7 shows a visitor near a bird cage.

A visitor could take an action with a real device that makes, alters or deletes virtual items. See FIG. 7. It shows Drew and his mobile device near bird cage 71. The latter is a real object. Drew manually opens door 72. Several virtual birds are made and are depicted in his app or a viewer's app as flying out of the cage. Other visitors nearby might try to capture them using apps on their mobile devices. The park connects the opening of the cage with Drew. Perhaps from cameras it has that focus on the bird cage, and correlated with his known position from the location of his mobile device.

Remote viewers may be able to see these virtual birds on their apps and be able to capture them. The park can enable such cases.

Conversely, with the same bird cage or a different one, if Drew goes to it and opens the door, one or more virtual birds nearby might fly into it. Depending on circumstances, Drew might be considered now to have captured them, and added them to his inventory of virtual items.

There might be a bird cage Phi housing a virtual hawk. If the birds released from cage 71 are, say, pigeons, then when Phi is opened, the freed hawk could kill some virtual pigeons.

6] Skill Levels;

For some themes, the park might let viewers possess abilities that cannot be traded with a visitor. This encourages viewers to keep watching the visitor and engaged with the app. The park can make revenue by showing ads to the viewer. With board games and computer games, one way to keep players engaged is to let them (try to) gain experience. Either in a given instance of a game or across plays of a game.

The park lets a viewer have an ability to control (either by herself or with others) an electromechanical device. For example. A viewer on skill level 1 (the lowest) can open and close certain physical doors in the park. With the caveat that a door can be opened only if it is unlocked. A viewer on skill level 2 can also unlock or lock those doors. A viewer on skill level 3 can also have a physical teddy bear wave its arms and point them in various directions. A viewer on skill level 4 can also summon an electric cart to a location in the park.

The abilities might be used when the person is a visitor.

How can a viewer or visitor get an ability? The park could sell it. Especially for viewers, this gives the park a new market.

7] Viewer Games;

The park might let viewers play in a game on the viewer app, in a 3 dimensional environment that is a simulation of the park. This has a scaling advantage that the park does not have with real visitors. There are safety limits on the maximum number of visitors the park can have. One of the bottlenecks to increasing revenue that a dependence of live visitors has. By contrast, a game simulation faces far less. More servers and more input and output bandwidth might be needed. The servers and hardware associated with the extra bandwidth take up far less room. And these might be at a data center located in regions with cheap real estate. Whereas the park is likely in an expensive region.

FIG. 8 shows a screen that can appear in the viewer's app when she runs it. The first choice is for the viewer to play alone. She plays as the sole player in a park simulation, taking a path or trajectory through the simulation. Another option is for her to play in a multiplayer game with other viewers.

A third option is to follow visitors. A fourth option is to join a visitor's team. These 2 options were discussed earlier.

The game played only by the viewers can differ from the game or task (eg scavenger hunt) being done by the visitors. The latter can be slow compared to FPS games. So the park could design a faster paced game to be played only by viewers. While the game or task done by visitors (perhaps involving viewers) can be designed separately. See FIG. 9. Item 91 is the pure viewer game. Item 92 is the game/task of the visitors, where this includes the possibility that 92 also involves viewers as followers or team members.

Figure 9:
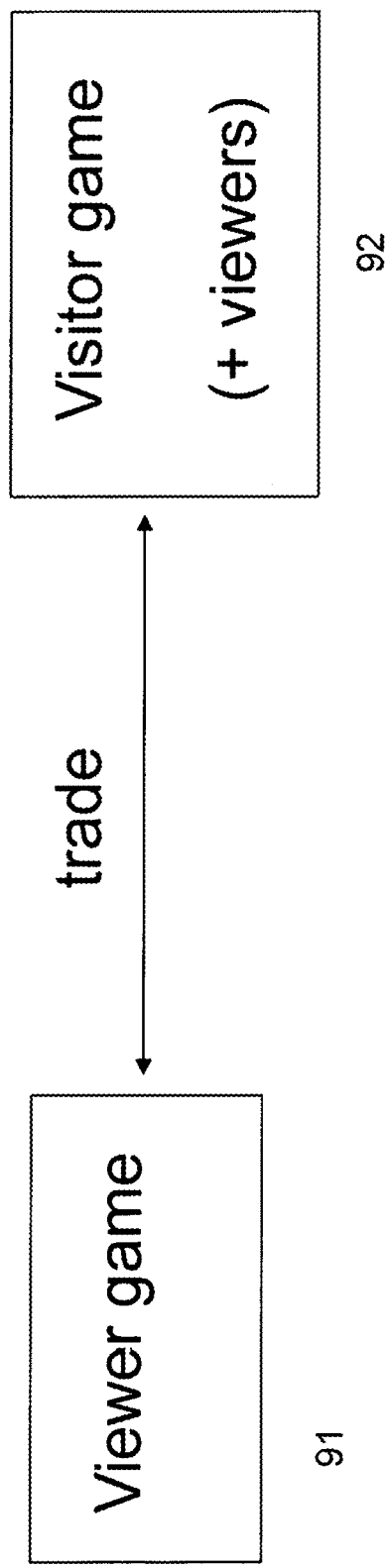
FIG. 9 shows interaction between a viewer game and a visitor game.

The games 91 and 92 interact via trade. FIG. 9 describes a loosely coupled system. Each game can be designed and maintained separately by keeping the interface simple.

The trade can incent viewers to play. They find, make, capture or earn virtual items (including virtual money), that can be traded with visitors. However the park could also design the viewer game to be playable as a standalone game.

Game 91 might not involve controlling or altering any real devices in the park. A pure computer game. Though it could have the layout of the park or a subset of the park.

One consequence of the loosely coupled nature of FIG. 9 is that there could be several games offered to the viewers.

A viewer game need not use a literal simulation of the park. Imagine as in FIG. 3 where the park has several themed areas—medieval village, space travel and haunted house. The viewer only game might be just a medieval village. Portions of the visuals in the game could be close to the actual medieval themed areas of the park. So the park can promote sections of itself to outsiders and build mindshare.

FIG. 9 is a deliberate design decoupling. There can also be a temporal decoupling. The park is unlikely to be open 24 hours 7 days a week. During the time that it is closed, viewers might still play their games. Because there is less direct real time interactions between viewers and visitors. This can be amplified if viewers amass enough virtual items to sell to visitors. During park closure, viewers, especially in other time zones, can earn a living in their game by collecting items. Their "shift" ends when the park opens for visitors and the viewers put their items for sale.

For a park, a second use of the viewer-only games is to run simulations of possible future configurations of the park. These simulations can look at what percentage of players successfully complete a game or task. And how long they take. At least for games where the "time" durations in the game correspond to real time durations. For an actual park layout, it can be an issue if a game is too hard for many visitors.

If there are enough viewers, the park could offer several configurations for playing by different viewers. Feedback in terms of remarks by viewers can also be solicited.

This can be taken a step further. See FIG. 2. The park makes a viewer-only game with 2 roles. A viewer remote from the park. Another viewer, who is remote but plays a role of an onsite visitor. This game could be represented by 2 apps or 1 app that runs in either role. There are 2 simulations going on. While the second role cannot fully reprise a live visitor in a real immersive environment, it could still furnish useful data for the park in deciding future experiences.

8] Reification;

Viewers and visitors have been described as interacting in 2 broad modes. One is where the both are in the same game, where the viewers might be followers of a visitor or on the same team as the visitor. Another, described in the last section, was the viewers and visitors playing separate games, with the interaction being the passing of virtual items between them.

Consider when both are in the same game. One gameplay feature is reification. By this we mean where a virtual item becomes (reifies into) a real corresponding item. Imagine a game of chasing puppies. The puppies exist as virtual items on the screens of the viewers and perhaps too on the screen of the visitor. They scamper and gamers have to catch them. Suppose viewer Laura catches one. The game might restrict her to giving (or trading it) with Drew, who is in the actual park. He walks to a physical object resembling a dog kennel. He uses his mobile device to "put" the virtual puppy into the kennel. Whereupon the kennel door opens and a physical toy puppy is ejected. Drew can give it to a child, say.

As Drew uses his visitor app to put the virtual puppy onto (say) the kennel's image in his device, the physical kennel can have physical bells and whistles that move and make sound, and lights that light up. The reader is familiar with using a computer, where as she drags an icon to drop it on a second icon, the latter might change colour to indicate that it can now accept the first icon. In a similar way, having physical objects do tangible actions adds to the reification ambiance.

Figure 10:
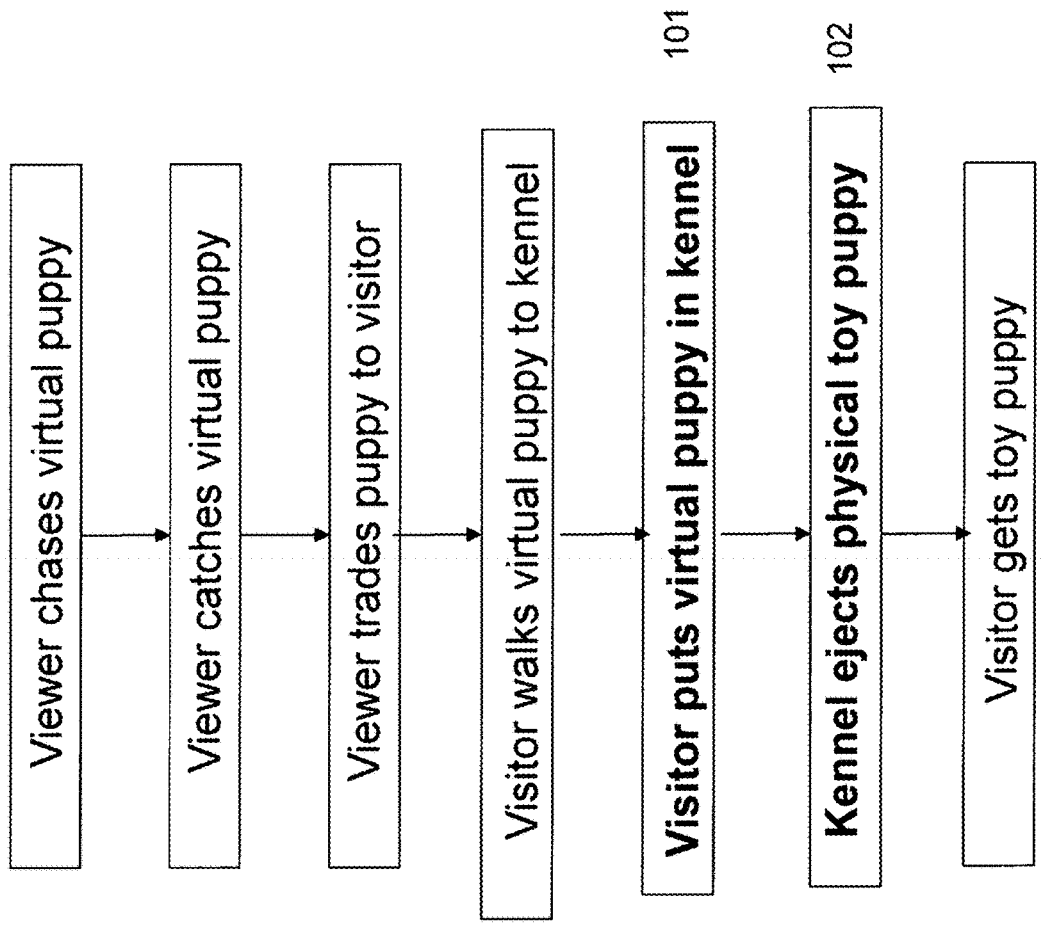
FIG. 10 is a flow chart of reification of a virtual object to a real object.

See FIG. 10. Highlighted steps 101 and 102 are the key reification steps.

A variant is where the physical toy puppy is an electromechanical puppy. Drew via his mobile device can now command this puppy.

The action of Drew putting his virtual puppy into the kennel causes it to be removed from the game and replaced by a physical toy puppy. This MR mode can enhance the overall game.

The kennel could have a 3d printer or some other type of maker machine. It might make an object resembling a puppy, and eject it to Drew, who can keep it.

Extensions are possible. One variant is for the visitor Drew to ask viewers to catch a virtual puppy. The first viewer, Laura, to do so sends it to Drew. In the game Laura played, it might give her a prize. In addition, or instead, Drew could compensate her in some way. Drew reifies it. In doing so, he might get a prize from his app. He could remit some or all of it to her. The prize could be fungible, like 20 "gold" coins. So he remits 10 coins to Laura.

A variant is where when Drew gets the virtual puppy from Laura, it tries to run away from him. So he has to do some task to (re)capture it. The task could be done entirely on his device. Or he might have to do some physical activity, like walking after the puppy.

A variant is where when Laura captures a virtual object and sends it to Drew, she automatically gets compensation from her game if Drew reifies it. She does not have to depend on his generosity. We say "her game" because the game could be one played jointly with Drew. Or she and Drew are playing different games.

A variant is where For Laura the task is to (try to) send the captured item to visitor Drew, who can reify. The "try to" is the variant. There might be several viewers tasked with capturing a puppy. The first to do so offers it to Drew. Gives incentive for each viewer to work quickly. It speeds up their gameplay experience and Drew's.

A variant is the language that an object (real or virtual) "talks" in. This "talks" here means both audio or (electronic) text coming from the object. Where "coming" can mean what is shown in an app used by visitor or viewer.

Suppose Laura is in Bangkok and she speaks Thai. She is chasing a virtual talking puppy. Her app knows or guesses what language she speaks. Perhaps when she installed it, she was asked to pick a preferred language. Or she is using a mobile device with GPS, and the app finds the location of the device. It maps that to the main language of Bangkok. In the chase of the puppy, it speaks Thai. She captures the puppy and sends it to Drew in Shanghai. He interacts with his app in Chinese. Now he chases the puppy with his app. The game can have the puppy speak in the main language of the region of the park, Chinese. (Drew also has the option to change this to another language.) Also, if Drew manages to reify the virtual puppy into a real toy puppy, the latter speaks Chinese.

One extension is where the puppy might "talk" in 2 languages. Like for Laura in Bangkok, it talks in Thai and Malay. While Drew's puppy only talks in Chinese.

Anti-reification can happen. Imagine Drew controlling a physical robot puppy. He does various commands and it responds. The task he is in requires him to convert this to a virtual puppy. He walks it to a physical object appearing to be a dog kennel. He commands it in. The puppy is taken out of the game. (Or at least until another player needs it.) A virtual puppy appears on Drew's screen. The game might need him to take this puppy to the next task. Or he might be able to trade it with a viewer; getting something virtual in return that he can use in the game.

Figure 11:
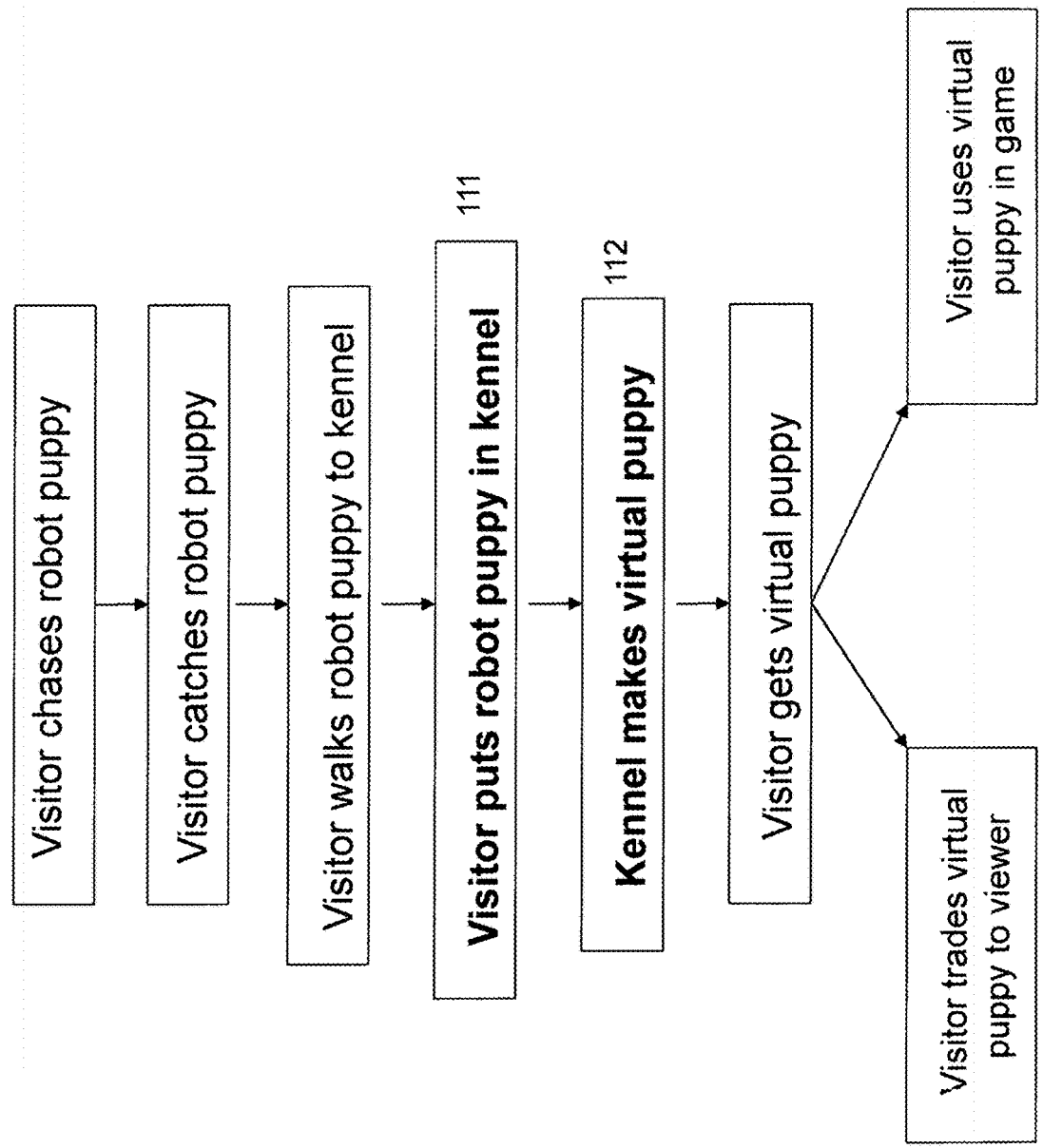
FIG. 11 is a flow chart of anti-reification of a real object to a virtual object.

See FIG. 11. The highlighted steps 111 and 112 are the key anti-reification steps.

9] Moving Viewer;

So far, the remote viewer Laura has not moved, or there has been no requirement for her to do so, while doing a game or activity on her device with Drew. He has been moving thru the park. There have been 2 overall scenarios. In one, she and Drew are in the same game, and she might be a follower of him or in the same team. In the other, she (and perhaps other viewers) are playing their own game, with just a minimal interaction with Drew in his activity.

This section describes how she moves in her physical environment. Her device is now a mobile device, just as Drew has a mobile device. Her app coordinates her travels to be thematic as possible with Drew's travails. Suppose Drew is in an area of the park with a jungle theme. Her app suggests that she go to an area of her town with a local public garden. Her app can find various suitable nearby areas and give directions. This is possible given that her device knows its outdoor location, and via such third party assets as Google Maps, and navigation software, her app (which means the park's servers) can provide directions. When she reaches or is near one of these locations, her app detects this. It might release more monsters near her, making them easier to capture, than if she was not in the suggested garden. The monsters might be of higher value, including being rarer.

Conversely, imagine a game where Laura is at a high skill level. To make her play increasingly difficult, the density of monsters around her can be sparser than for the average (lesser) player. And the monsters near her can be more dangerous, making them harder to capture or kill.

If she captures a monster, apart from what points she might get from that action alone, she can trade it with Drew, to some mutual benefit determined by the game.

If she and Drew are both in similar outdoor environments and themes, this could also benefit Drew. He might find or capture something more useful to her, if she is in her current garden surroundings. They could trade. For example, suppose he is in a garden with flowers. She can be directed to flowering plants. Her app might from its database have locations of such plants in the garden she is in. Or her app can use image recognition to detect from her device camera when she is near flowers.

Regarding the database having locations of flowering plants in a botanical garden, this extrapolates the increasing fine grained information in maps. It is well known that Google Corp. has cars that travel city streets, to keep Google Maps up to date. In related ways, large public gardens could also have information about their interiors in databases that can be queried. Laura's app can ask her to take a photo of a flower. Perhaps of a particular type of flower, like a tulip or rose. Her app verifies this and she now has a virtual flower as part of her inventory. To perhaps be used later, or traded with Drew if he is in a context where he can use it.

One example of a joint interaction is where the theme park has Drew needing an image of a flower. Where this must be taken of a live flower in a public space. When Laura and Drew are teamed, he sends a message to her, asking her to find a black rose, say, in a public space. Essentially, each can look for items for the other.

Her app and Drew's are front ends to a unified game server. This server can use the resources in the theme park, which it knows precisely in terms of their features and locations, and knowledge about Laura's surroundings. The latter is expected to be less precise.

Another example is if Drew is in an indoor museum theme. Laura's app suggests a nearby library or even an actual museum, with directions to it. Such events let the park and library or venue do a cosponsorship to benefit both parties.

More generally, one person might be indoors and the other outdoors. A game can be where both are separately looking for prizes or clues in deliberately disparate contexts.

10] Movie and Park;

Another example supposes the park has a movie studio that released a movie currently playing worldwide in theatres. Laura's app encourages her to go to a nearby theatre where the movie is playing. Given that her app knows its location, the app also can access data about which theatres in her town are playing the movie, and give directions to one.

If Laura goes to the theatre, her app can offer her a discount on the concessions (food and drinks) or on a ticket to that movie. The latter helps the park generate sales of its other subsidiaries. The former discount directly benefits the theatre. There can be arrangements where the park gets some of this.

If she is in the room where the movie is playing, there might be clues or rewards via the movie or in trailers playing before the movie. For example, a trailer shows an item and a barcode (eg QR) and some text about the item. Laura scans it with her game app. (The app has an option to do this.) The app decodes the barcode in the image to an URL. The app appends an argument to the URL. Then it sends the altered URL to the device browser. The browser sends the URL to the park server, which displays a page on her browser. The extra argument in the URL is detected by the server. Now the park knows that she is playing one of its apps. Hence she might get a bigger discount on an item than another patron, Tim, in the room with no involvement with the park app. Because if Tim decoded the barcode with a generic decoder, nothing is added to the URL. So the park server knows that Tim is not playing a park app associated with a remote viewer. Laura gets a different (lower) price than Tim.

Figure 12:
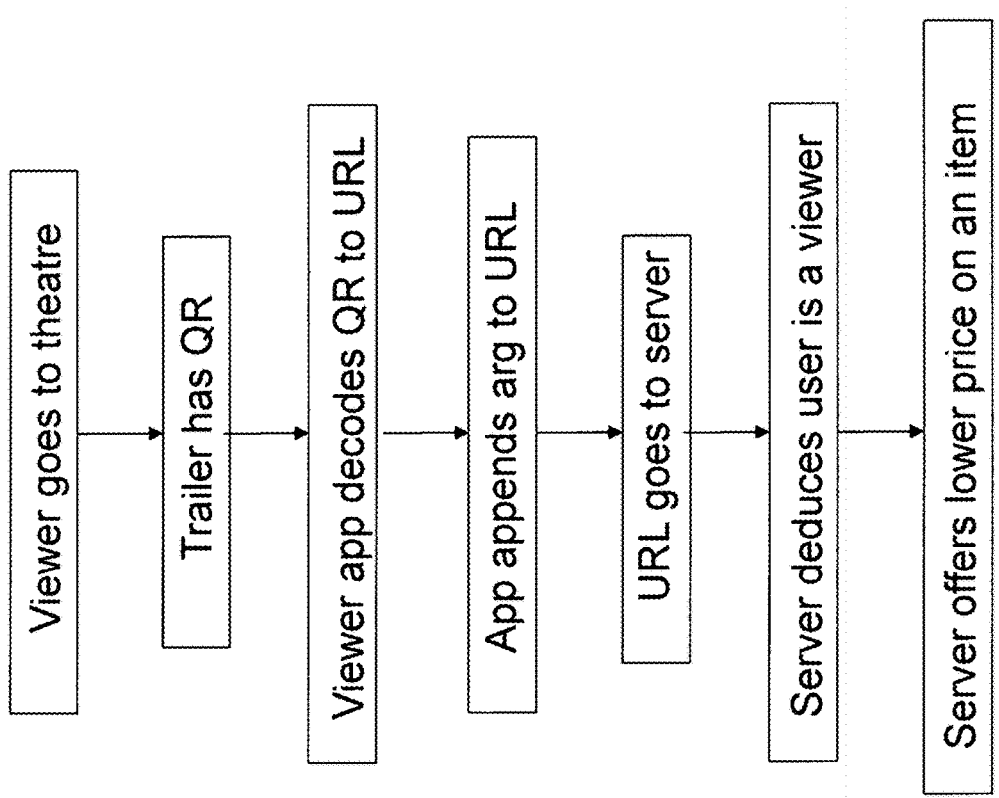
FIG. 12 is a flow chart of a viewer in a theatre getting a discount on a trailer.

FIG. 12 is a flow chart of this process. For brevity, it describes a barcode in QR format. Other formats are possible, like Data Matrix. The generalisation of FIG. 12 and the previous paragraph is how to solve the problem where an audience by necessity has to see the same images on a screen. One of these images is a barcode to an item. But the desire is to offer this item at different prices, say, to different patrons. A solution arises if the patrons use different mobile apps. An app can append a nonce or key or code to a decoded URL. This nonce is used by the server to classify the user and to send a different webpage (or different information in general) to that user, compared to other users with different nonces.

Figure 13:
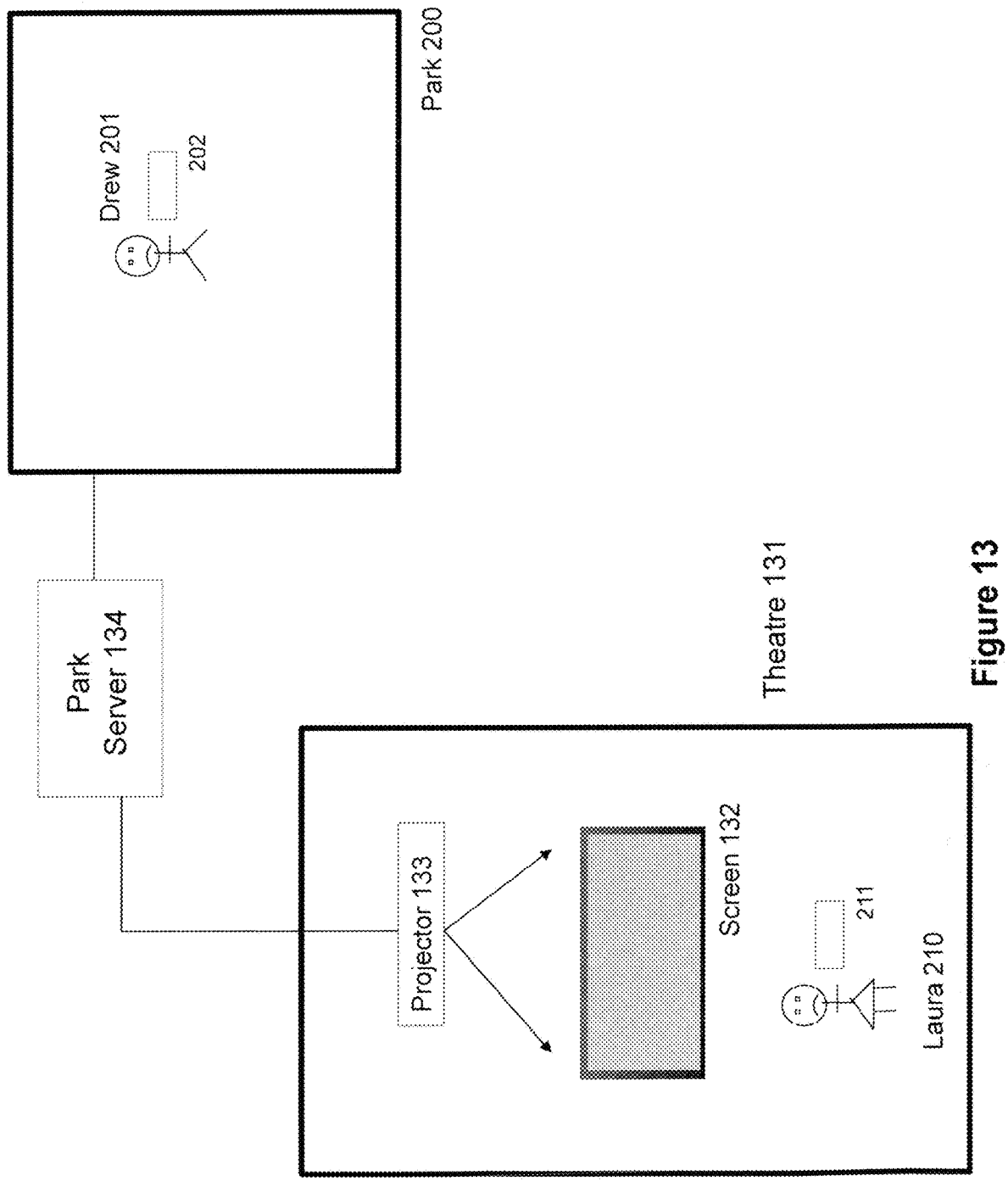
FIG. 13 shows a viewer in a theatre and a visitor in the park.

FIG. 13 shows Laura 210 and her mobile device 211 in movie theatre 131. She is in the room where the movie is to be shown. She is in front of and watching the projection screen 132. It is shone upon by digital projector 133. That is connected to park server 134. The latter is shown outside park 200. It could be inside the park. And Drew 201 with his mobile device 202 is in the park and doing some game or activity. For clarity, FIG. 13 omits explicit depiction of the park visitor app running on device 202 and the park viewer app running on device 211.

Granted, when a trailer plays before a movie, it is usually by an unaffiliated firm. But a trailer could be by a firm making a product that has a tie-in with the movie. So patrons who came to see the movie might be interested in the product. The above method can enhance this. By targeting a user (Laura) who has shown extra interest because she downloaded an app made by the movie studio and park.

During the movie, her app can be synchronised to when the movie started. This can be done by her app listening for specific audio at the start and perhaps periodically during the movie. There is prior art on this being done to identify songs.

Or, given that the movie is likely played in fully digital form, the digital projector could be questioned by the park server, as to when it started playing the movie. Equivalently, when the projector started the movie, it contacts the park server and tells it the id of the projector and when it started playing. The server has a database that maps the projector id to the location of the theatre that the projector is in. When the server is given Laura's device location, it finds the theatre and how far into the movie (or when the movie will play) it is. This can be computationally easier than listening for and id-ing audio from the movie.

Figure 14:
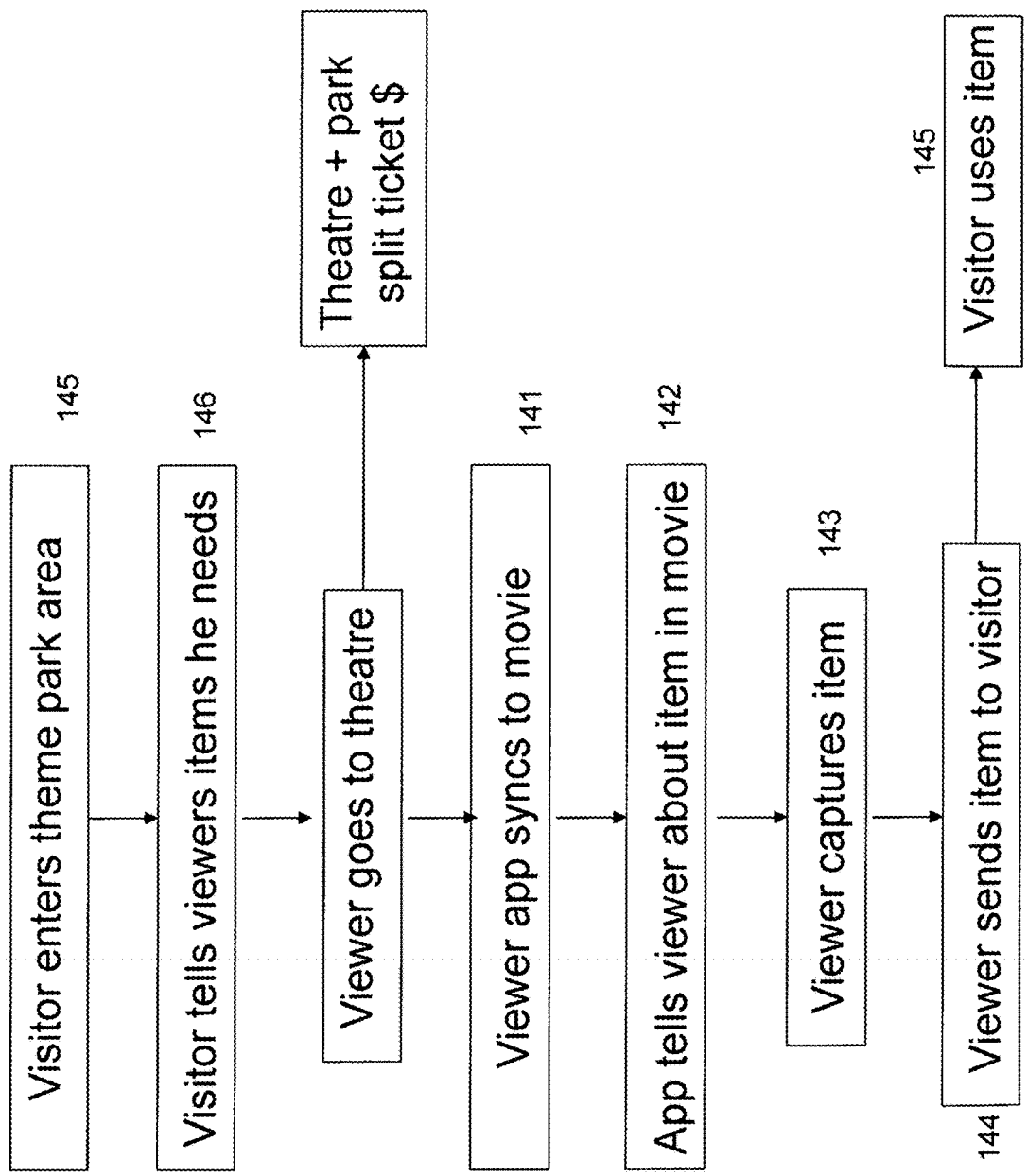
FIG. 14 is a flow chart of a viewer in a theatre sending an item to a visitor.

See FIG. 14.

Once the app syncs to the movie (see item 141), at various times it could (for example) alert Laura that there is an object (eg a jacket, a handbag) in the movie whose image she should "capture". See item 142. She uses her mobile device to do this. See item 143. Image recognition is done on the image (or video) by the app or its server. If the object is identified, then she owns a virtual instance of it. A prize in some virtual currency could be awarded to her.

A variant is that the syncing of the app (item 141) is optional. The app might show the information about desired items when it boots up, without hints about when in the movie these will appear.

A variant is where the app asks her a simple question based on what she just saw in the movie. Or on what is happening or to prepare her for what will soon happen. This could be in the format of a multiple choice set of answers, where she just has to pick one answer. A correct answer can let the app award her a prize of some kind. The prize might be a virtual scroll, for example, or credits in some artificial currency. If the prize is a virtual item, that might be later sent to Drew in the park.

On the issue of a mobile device being used in the movie room, note that during trailers, a theatre might actually encourage use. In some theatres in the US (and elsewhere), the period of time when trailers are shown includes ads that are not trailers (ie ads not for other movies). These ads might have phone numbers (perhaps 5 digits or less) that patrons are encouraged to text or call while they are in the room. The theatre gets paid for those ads from third parties. However, when the movie starts, the theatre strongly discourages audible use of mobile devices. This is understandable and this application stresses that it agrees with the policy. The viewer app used by Laura should inform her by visuals and perhaps by a silent vibration of the device.

When she is sitting in the theatre, and not moving, she is equivalent to the Laura of the earlier sections, who was not required to move. And whose surroundings had no bearing on her interactions with the park app and visitors. But suppose the park has themes medieval village, jungle and space travel. If the movie has some connection of any of these, then interactions between her and visitors to that theme can reinforce the experiences of both.

Suppose the theme is medieval village. If the movie shows an actor carrying an axe, her app gets her to capture the axe. She can use it in virtual form on her app to hack through opponents, if that is what her game is about. Or she can trade it with Drew for his needs in the park. See item 144.

A variant is where "capture" does not mean take a photo of it. The app might show a button. Laura clicks this when she sees the axe appear in the movie. This might be easier than her having to raise her device and take a photo. Possibly less distracting to others behind her.

A variant is where Drew is in the medieval part of the park. The movie was written to have tie-ins. At various parts of the medieval park, Drew might need different items in virtual form, like an axe, a scroll, a pitcher. Suppose he currently needs a scroll. And he has a team of viewers, or viewers who are just following him. He puts out a request (his app and the viewer app specifically let him do this) for a scroll. This request can mention that (eg) "Hey if you're in a theatre showing [Film name], see if you can capture a scroll for me."

Or when he first went into the medieval park, he is told by the park that he will need those above items. He messages the viewers with the entire list. They can start looking in the movie for the items. The items 145 and 146 in FIG. 14 implicitly refer to the steps of this and the previous paragraph.

A variant is where the server/apps automatically send his messages only to those viewers already watching that movie. In turn, a variant is where suppose when those messages went out, Laura was not in the theatre. She does not get the messages. But she then goes to the theatre 15 minutes later. The server finds out by the methods described above. It sends her those messages.

The server knows the items that Drew is asking for. It also has timecodes for the movie for when those items are visible. The movie was designed to be compatible with the medieval park. The tasks in the park gave rise to a complete set of virtual items that can be used. These items (or a subset) were made visible in the movie, and all the timecodes were determined a priori to the movie being shown publicly.

Given this, the viewer app can give heads up whenever a desired item in Drew's list is above to appear. A variant is where Laura can turn off this option. Why? If it is off, she has to pay more attention to the movie. The advantage is that if she captures an item, she gets a greater credit for it in the game.

When Laura captures an item, she might get a credit. If she offers it to Drew and Drew accepts, she could get another amount of credit. (This amount could differ from the capture amount.) Why? Drew might only need one instance of the item. If several viewers offer him the item, he might or can only pick one. This is a gamification to encourage viewers to be quick. But in this case, it may be good game design to ensure that unsuccessful viewers get some compensation.

A variant is where there are several visitors like Drew wandering thru the park. So there might be a continual demand for medieval items in the movie. This can alter the dynamics of Laura and other viewers.

A variant is where the Laura is in a different time zone from Drew. She might go to the theatre, and capture various items from the movie. But there might be little demand from visitors in the park. The park might be closed for example. The park might let Laura put her items up for "sale" or "trade", where these actions can be more precisely defined by the park. There can be a queue of items submitted by various viewers throughout the world. When the park reopens, and Drew is one of the first visitors, he might check the queue on his device and get the items he needs.

For simplicity, when he gets a scroll, this is the earliest instance of the scroll in the queue, and ditto for other items. An alternative is to let him pick which instance of the scroll to accept. In this case, the queue might show information about the viewers who submitted each item. Drew could pick only those from a given viewer, for example.

A variant is where Drew has a list of his followers from earlier times that he visited the park. Or Drew has a team of followers, and Laura is on that team. His app can have a simplifying option that defaults to him getting items from his team by default. And if he still needs items, to let him get from the queue, from viewers not on his team.

A variant is when Laura starts her viewer app, and it is the typical time of the day or week in her region for matinee shows. In the US, these are typically Monday to Friday in the afternoons. This can extend to include afternoons on the weekends. For decades, theatres have given substantial discounts on tickets to patrons entering at those hours. During matinee sessions, many theatres are mostly empty. The marginal cost of an extra patron is small. Laura's app can encourage her to attend the park's movie in a matinee. With possibly an extra discount to the matinee price.

A variant is for her app to suggest that she schedule a visit to the theatre for a matinee, even if she ran the app in the evening.

What if the movie does not fit the themes of the theme park? Earlier was described how Laura might get a quiz during the movie, based on what just happened or is happening in the movie. Prizes could be virtual items that Drew needs. These items need not have any correlation to the movie.

When Drew gets an item from Laura, he uses it via the mechanisms in his app. Suppose it is a virtual key that opens a real locked door to a real room in the park. He goes in and finds that he needs other items. He messages Laura, listing those items. And possibly to others in his team or following him. Thus far, this is the same as earlier sections. But now Laura and some others are in theatres watching the movie made by the park. In general, they are not in the same theatre. And there is no assumption that the theatres are synced with each other. Some theatres might have started an hour earlier showing the movie than others.

Now there might be no hints in their viewer app about when upcoming in the movie will be those items. Or perhaps there are hints. In either case, Laura can search for and try to capture the items where they appear. Any she captures can be submitted to Drew. This is a loop that can be repeated. See FIG. 15 and items 151, 152 and 153. Items 143, 144 and 145 are from FIG. 14. One caveat is that in different loops, the viewer who successfully captures an item and has it accepted by Drew might be different. Item 151 was omitted from FIG. 14 for brevity in that figure.

A variant is that if Laura's item was accepted by Drew, then when he sends out a request of other items, it only goes to Laura.

Figure 15:
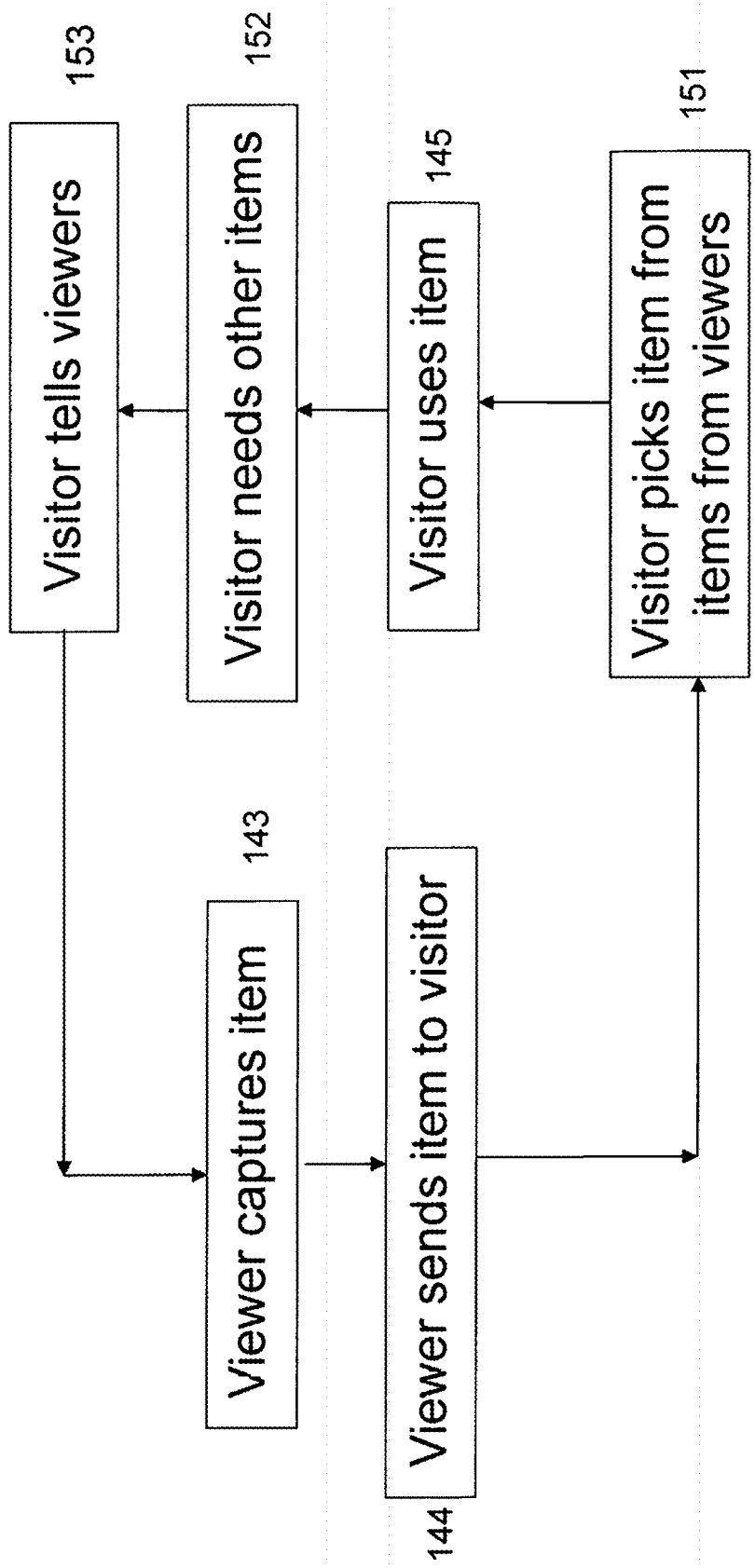
FIG. 15 is a flow chart of viewer and visitor repeatedly interacting.

Note that FIG. 15 does not mention the theatre. It can pertain to a general interactive loop between viewers and visitors.

An extension is where the movie is made by a firm independent of the park. In this case, there can be a relationship between these parties to coordinate and enable the actions described in this section.

11] Anti-Cheating;

A problem with the previous section can be where people post solutions on social media to the various questions that Laura can get about the movie. The park and theatre might not necessarily regard this as bad. The main consideration could be to ensure that she pays to watch the movie.

One way is for a code to be printed on the paper ticket that she gets when she pays. The code can be written in text or in a barcode. It has data specific to that theatre location and date. She runs the viewer app and takes an image of the ticket. The image or the decoded data can be uploaded to the park server.

Suppose the theatre issued the ticket in the form of an image it shows on an electronic screen to her at the time of payment. She takes a photo of the image with her device and proceeds as in the previous paragraph.

Similarly, suppose Laura paid electronically, perhaps with a credit or debit card. This can happen if she buys online. The theatre could get electronically an electronic address of hers, like her email address. The theatre sends a receipt to the address. Her device can upload this to the park server.

When the movie plays, other measures can be done. Consider when a quiz can be shown, where prizes are virtual items to be used by a visitor to the park. If these prizes are not correlated with items in the movie, then the park makes many quizes and associated with different points in the movie. When Laura watches, her app shows a randomly picked subset.

Also, not all the questions might be concurrently used over all the viewers. If say 1000 questions are made, the first 100 are used over all viewers. This does not mean that a viewer gets 100 questions, only that her questions are picked from those 100. After some time (days or weeks), the second 100 are used. The question of when to introduce the next batch of questions can be answered in part by the server seeing if the percentage of right answers rises and if the time taken to get those answers falls. This might indicate that the answers are circulating socially and it is time to use new questions.

Figure 16:
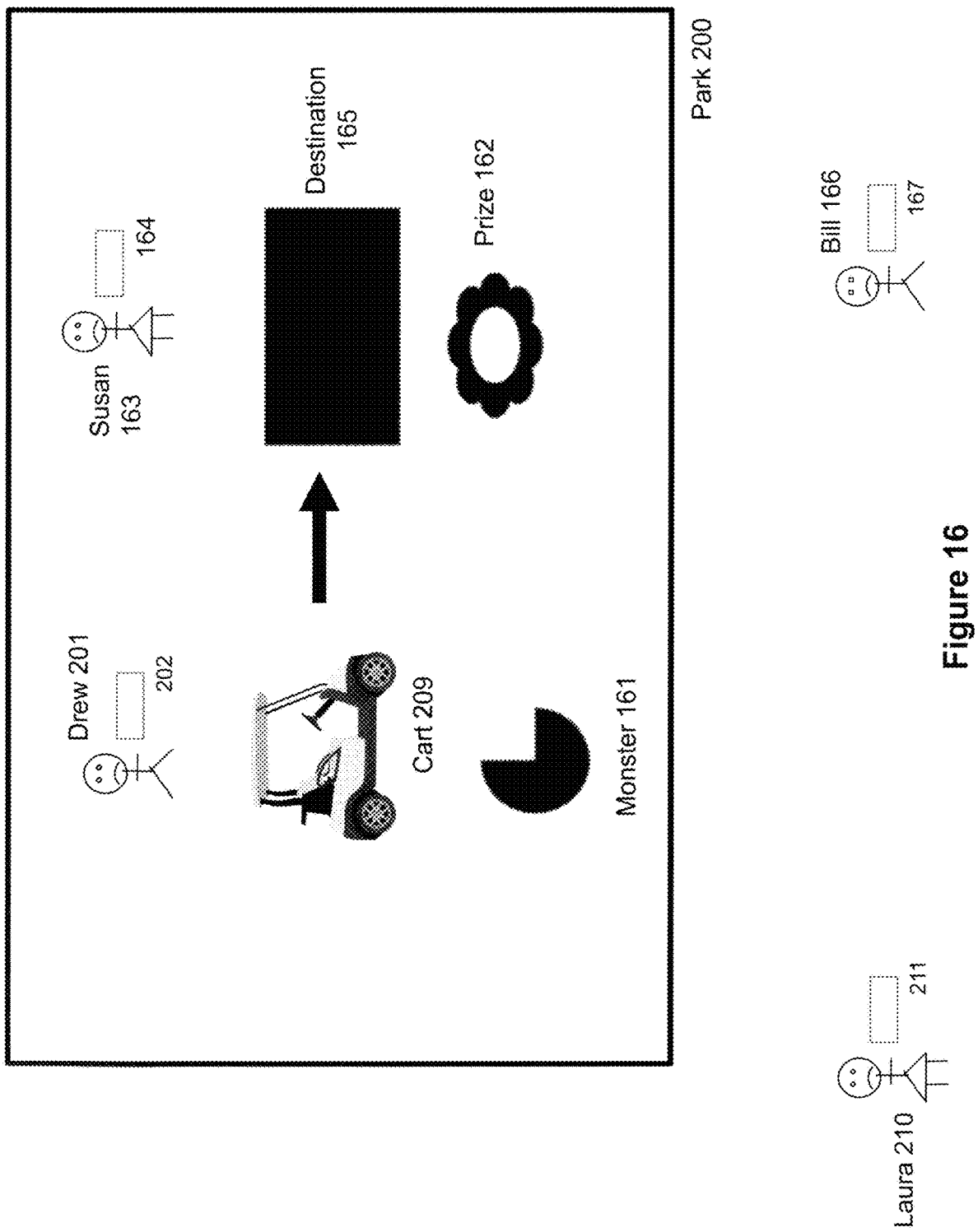
FIG. 16 is a multiple Mixed Reality scenario.

12] Multiple Mixed Realities (MMR);

So far, we considered MR as 1 instance of a MR game, with several players (visitors and viewers). But the park can host multiple MRs (MMR) overlapping in the same physical space. A simple example is shown in FIG. 16. In park 200 is Drew 201 and his mobile device 202. Outside the park is viewer Laura 210 with her device 211. The are playing in a common instance of a MR game.

Now in the park is visitor Susan 163 with mobile device 164. Outside is Bill 166 with his device 167. Susan and Bill are in the same MR game. This game is different from the game that Drew and Laura are in. There are 2 cases.

First. Drew and Laura are in instance Alpha of a MR game. Susan and Bill are in a different instance Beta of the same MR game.

Second. Drew and Laura are in an instance of MR game Dead Monkeys. Susan and Bill are in an instance of a different MR game Hunt Dragons.

In what follows, we treat both cases. Players in any instance of any MR game are assumed not to be able to see in their devices players or virtual items in other instances of any MR game. In other words, each instance is its own universe. But in the real park are various real devices controllable by visitors and viewers. A given device might be represented differently in different instances. The point of intersection between the instances is how to decide who (which player or players) controls the device at any given time.

FIG. 16 shows cart 209 in a current location, between Drew and monster 161, which is in his game instance. Drew wants to capture the monster. Currently on his device screen, he cannot see it, because his instance depicts cart 209 in such a way that it completely blocks the monster. Laura is on his team and wants to aid him. She can see the monster on her device, but she cannot message Drew to tell him. She can try to control cart 209. If she can move it to Destination 165, Drew will be able to see the monster on his screen and hopefully capture it.

Note that the figure of cart 209 shows the cart as an open air vehicle, where someone outside on the left side of the cart can see thru to the right side. But what matters is the representation of the cart in the app used by Drew. That can (and does in this example) show the cart as opaque in the left to right direction thru the cart.

Earlier was discussed where perhaps several viewers in a game instance might have different opinions where to command the cart to go. So various options were mooted to decide amongst viewers.

What is new in this section is the other instance of a MR game, with Susan and Bill. Bill is assumed to be trying to hinder Susan. He might be on a different team. In this instance exists Prize 162. Susan is standing near it, as depicted. But she is assumed not to have seen it yet on her device 164. Perhaps she is not looking into it, or she is, and is pointing her device in a different location. If she looks in the direction of prize 162 with only her eyes, she cannot see it because it is virtual. Bill does not want Susan to get the prize. He realises that if he can move cart 209 to destination 165, then this blocks Susan's view of the prize, when she uses her device to look in 162's direction.

So Bill and Laura, both viewers, in different games, in different roles (Laura trying to help, Bill trying to hinder) send essentially the same command to the same real device. Assuming the device gets no other commands from other players, the server decides to let the device move to 165. Ostensibly, the device is under the control of several viewers. Each might think it has exclusive control for some period of time.

FIG. 17 shows the 2 games Dead Monkeys 171 and Hunt Dragons 172. These can be taken to be the server programs for those games. Dead Monkeys has 3 instances. One instance has Laura 210 sending a command to cart 209. Another instance has Dinesh 174. Another instance has Tim 175. This assumes that each instance has only 1 player in each currently sending a command to cart 209. Hunt Dragons has Bill 166 in one instance. It has Jill 176 and Zoe 177, both assumed to be in the same instance, and this instance differs from the instance that Bill is in. It also has Tanya 178 in a third instance. The games 171 and 172 send their received commands to server 173. The server decides which command gets run on cart 209. Games 171 and 172 can be considered to be the game servers for each game.

Earlier in this section, we described (see FIG. 16) that Laura and Bill are viewers, but this is not limiting. Several of the other players in FIG. 17 can be visitors.

Implictly, in earlier sections, when we said the park operates the cart, the decisions came from server 173.

A variant is where games 171 and 172 decide which of their received commands gets send to server 173, reducing its burden.

More complicated scenarios can possible. All arise because instances are played in an overlapping area. This may be expected because of the cost of the devices and designing games to use them. The park wants to maximise use of its space and devices. A solution is to have different game instances being played in the same or overlapping area.

There can be numerous methods to decide whose command gets run on a device.

One. If there are different instances of various games or of just 1 game sending commands to the device, then pick an instance. This instance can have several players sending different commands to the device. Use earlier methods to pick eg the most popular command and run it. Later, when deciding another command to send to the device, pick a different game instance. To give other players of other instances a chance to use the device.

The picking of an instance can be done at random or by other means.

Two. Regardless of how many different instances want to control the device, each instance sends a set of commands to it. For all commands from all instances, tote up the popularity of each command. The most popular command can come from different instances, as in FIG. 16. Run this command. This method includes the case where a game instance has several players in it sending the same command.

Three. To reduce the number of commands to consider, the commands for a given game (coming from instances of the game) might be filtered by discarding those arriving too late after some cutoff time. In one limit, just take the earliest of those commands.

Four. Extending method 3 across all games, just take the earliest command.

Five. In FIG. 17, game 171 might send all its commands to server 173. While game 172 could pick only 1 command to forward. In turn, the server can use a separate method to decide amongst its received commands.

More methods are possible. The above are not meant to be limiting.

One extension is that a command can refer to multiple devices. A command to move the cart in FIG. 17 might also have a subcommand that tells a garage door to open, so that the cart can enter the gargage. It is a question of (arbitrary) semantics whether the subcommand should be a command in its own right or not.

We claim:

1. A system of a theme park with remotely controlled electromechanical devices, wherein the electromechanical devices comprising one or more of: (a) a door, (b) a light, (c) a vehicle, (d) a fountain, (e) a loudspeaker, (f) a cupboard, (g) a chest of drawers, (h) a cage, (i) a container, (j) a drone, (k) a camera, (l) a microphone, (m) an HVAC of a building, the system comprising:

the park interacting with an onsite visitor and an offsite viewer;

the park having a viewer app;

the viewer using a first electronic device to interact with the viewer app;

the park having a visitor app;

the visitor using a second electronic device to interact with the visitor a pp;

the viewer app tracking the visitor location;

the viewer app sending one or more commands directly to an electromechanical device near the visitor;

wherein the command causes a change occurring to the electromechanical device; and the change being detected by the visitor.

2. The system of claim 1, where the electromechanical device is a door; where the command is one of: a) unlock, b) lock, c) open, d) close the door.

3. The system of claim 1, where the electromechanical device is a light; where the command is one of: a) turn on, b) turn off, c) raise the intensity, d) lower the intensity.

4. The system of claim 1, where the electromechanical device can be moved; where the command is one of: a) move, b) stop.

5. The system of claim 1, where the electromechanical device can be rotated; where the command is one of: a) rotate by a given amount, b) change the angular velocity.

6. The system of claim 1, where the park uses the viewer app and the visitor app to let the visitor and viewer form a team.

7. The system of claim 1, where the park lets the visitor pursue a virtual item by using the visitor app; the visitor app displaying the virtual item if it is in line of sight of the visitor and if there is no intervening physical object.

8. The system of claim 1, where the electromechanical device is in a line of sight between the visitor and a virtual item;

the electromechanical device preventing the virtual item from being visible on the visitor app;

the viewer app sending a command to the electromechanical device to move or rotate;

the electromechanical device moving or rotating; the virtual item now visible in the visitor app.

9. The system of claim 1, where the viewer app sends a command to the electromechanical device to move or rotate;

the electromechanical device moving or rotating;

the electromechanical device now in a line of sight between the visitor and a virtual item;

the virtual item now not visible in the visitor app.

10. The system of claim 1, with a plurality of viewers tracking a visitor; each viewer using an instance of the viewer app;

the electromechanical device having several possible commands;

several instances of the viewer app each picking a command for the electromechanical device;

the instances sending the commands to a server of the viewer app;

the server choosing a command;

the server sending the command to C the electromechanical device;

the electromechanical device performing the command.

11. The system of claim 1, with the viewer app and the visitor app trading virtual items.

12. The system of claim 11, with the visitor app sending the viewer app a list of desired virtual items; the viewer app searching the surroundings of the viewer for the virtual items; the viewer app capturing several virtual items; the viewer app sending the captured items to the visitor app.

13. The system of claim 11, with the viewer app sending the visitor app a list of desired virtual items; the visitor app searching the surroundings of the visitor for the virtual items; the visitor app capturing several virtual items; the visitor app sending the captured items to the viewer app.

14. The system of claim 1, where the viewer app shows a simulation of the park or a subset of the park; the viewer app, under the control of the viewer, taking a path through the simulation; the viewer app performing actions; the actions causing changes in virtual entities in the simulation.

* * * * *